(12) United States Patent
Xu et al.

(10) Patent No.: US 10,933,410 B2
(45) Date of Patent: Mar. 2, 2021

(54) COMPOSITE EXTRACTANT-ENHANCED POLYMER RESIN, METHOD OF MAKING THE SAME, AND ITS USAGE FOR EXTRACTION OF VALUABLE METAL(S)

(71) Applicant: II-VI Delaware, Inc., Wilmington, DE (US)

(72) Inventors: Wen-Qing Xu, Medfield, MA (US); Vincent D. Mattera, Jr., Gibsonia, PA (US); Marie Ysabel R. Abella, E.B. Magalona (PH); Gomer M. Abrenica, Manaoag (PH); Shailesh Patkar, Irwin, PA (US)

(73) Assignee: II-VI Delaware, Inc., Wilmington, DE (US)

( * ) Notice: Subject to any disclaimer, the term of this patent is extended or adjusted under 35 U.S.C. 154(b) by 120 days.

(21) Appl. No.: 15/759,561

(22) PCT Filed: Oct. 25, 2016

(86) PCT No.: PCT/US2016/058630
§ 371 (c)(1),
(2) Date: Mar. 13, 2018

(87) PCT Pub. No.: WO2017/074921
PCT Pub. Date: May 4, 2017

(65) Prior Publication Data
US 2019/0054457 A1    Feb. 21, 2019

Related U.S. Application Data

(60) Provisional application No. 62/248,473, filed on Oct. 30, 2015, provisional application No. 62/269,174, filed on Dec. 18, 2015.

(51) Int. Cl.
*B01J 39/05* (2017.01)
*C22B 59/00* (2006.01)
(Continued)

(52) U.S. Cl.
CPC .............. *B01J 39/05* (2017.01); *B01J 20/22* (2013.01); *B01J 20/321* (2013.01);
(Continued)

(58) Field of Classification Search
None
See application file for complete search history.

(56) References Cited

U.S. PATENT DOCUMENTS

| | | |
|---|---|---|
| 2,860,031 A | 11/1958 | Grinstead |
| 3,018,243 A | 1/1962 | Nevens |

(Continued)

FOREIGN PATENT DOCUMENTS

| | | |
|---|---|---|
| CN | 103789547 A | 5/2014 |
| GB | 862204 | 3/1961 |

(Continued)

OTHER PUBLICATIONS

So et al., "New SPE column packing material: Retention assessment method and its application for the radionuclide chromatographic separation", Journal of Radioanalytical and Nuclear Chemistry, 2008, pp. 651-661, vol. 277 No. 3.

(Continued)

*Primary Examiner* — Melissa S Swain
(74) *Attorney, Agent, or Firm* — Blank Rome LLP

(57) ABSTRACT

A composite extractant-enhanced polymer resin comprising an extractant and a polymer resin for direct extraction of valuable metals such as rare earth metals, and more specifically, scandium, from an acid-leaching slurry and/or acid-leaching solution in which ferric ions are not required to be reduced into ferrous ions. The extractant may be cationic, non-ionic, or anionic. More specifically, the extractant di(2-ethylhexyl)phosphoric acid may be used. The polymer resin may be non-functional or have functional groups of sulfonic acid, carboxylic acid, iminodiacetic acid, phosphoric acid, or (Continued)

Column Process results of using Purolite S957 and Purolite S957-DEHPA for extracting rare earth metals from acid-leaching solution that contain a large amount of ferric ions.

amines. The composite extractant-enhanced polymer resin may be used for extraction of rare earth metals from acid-leaching slurries or solutions.

18 Claims, 4 Drawing Sheets

(51) Int. Cl.
| | |
|---|---|
| B01J 49/06 | (2017.01) |
| C22B 3/38 | (2006.01) |
| B01J 39/16 | (2017.01) |
| B01J 49/53 | (2017.01) |
| B01J 20/32 | (2006.01) |
| B01J 20/22 | (2006.01) |
| C01F 17/10 | (2020.01) |
| B01J 47/016 | (2017.01) |
| B01J 47/011 | (2017.01) |
| B01J 39/18 | (2017.01) |
| B01J 47/02 | (2017.01) |
| C22B 3/42 | (2006.01) |

(52) U.S. Cl.
CPC .......... *B01J 20/3244* (2013.01); *B01J 39/16* (2013.01); *B01J 39/18* (2013.01); *B01J 47/011* (2017.01); *B01J 47/016* (2017.01); *B01J 47/02* (2013.01); *B01J 49/06* (2017.01); *B01J 49/53* (2017.01); *C01F 17/10* (2020.01); *C22B 3/0068* (2013.01); *C22B 3/42* (2013.01); *C22B 59/00* (2013.01); *Y02P 10/20* (2015.11)

(56) References Cited

U.S. PATENT DOCUMENTS

| | | | |
|---|---|---|---|
| 3,159,452 A | 12/1964 | Lerner | |
| 3,524,723 A | 8/1970 | Millsap et al. | |
| 3,582,263 A | 6/1971 | Chiola et al. | |
| 3,751,553 A | 8/1973 | Gaudernack et al. | |
| 3,969,476 A | 7/1976 | Lucas et al. | |
| 4,041,125 A | 8/1977 | Alstad et al. | |
| 4,624,703 A | 11/1986 | Vanderpool et al. | |
| 4,647,438 A | 3/1987 | Sabot et al. | |
| 4,718,996 A | 1/1988 | Vanderpool et al. | |
| 4,751,061 A | 6/1988 | Kim et al. | |
| 4,808,384 A | 2/1989 | Vanderpool et al. | |
| 4,816,233 A | 3/1989 | Rourke et al. | |
| 5,015,447 A | 5/1991 | Fulford et al. | |
| 5,030,424 A | 7/1991 | Fulford et al. | |
| 5,708,958 A | 1/1998 | Koma et al. | |
| 5,787,332 A | 7/1998 | Black et al. | |
| 6,110,433 A | 8/2000 | Kleinsorgen et al. | |
| 6,238,566 B1 | 5/2001 | Yoshida et al. | |
| 7,138,643 B2 | 11/2006 | Lewis et al. | |
| 7,282,187 B1 | 10/2007 | Brown et al. | |
| 7,799,294 B2 | 9/2010 | Kordosky et al. | |
| 7,829,044 B2 | 11/2010 | Makioka et al. | |
| 8,062,614 B2 | 11/2011 | Kordosky et al. | |
| 8,177,881 B2 | 5/2012 | Sugahara et al. | |
| 8,328,900 B2 | 12/2012 | Bednarski et al. | |
| 9,481,638 B2 | 11/2016 | Goto et al. | |
| 2004/0031356 A1 | 2/2004 | Lorenzo et al. | |
| 2005/0107599 A1 | 5/2005 | Makioka et al. | |
| 2006/0024224 A1 | 2/2006 | Neudorf et al. | |
| 2010/0089764 A1 | 4/2010 | Torres et al. | |
| 2010/0282025 A1 | 11/2010 | Nisbett | |
| 2012/0100049 A1 | 4/2012 | Tavlarides et al. | |
| 2012/0160061 A1 | 6/2012 | Heres et al. | |
| 2013/0283977 A1 | 10/2013 | Lakshmanan et al. | |
| 2017/0260606 A1 | 9/2017 | Kasaini | |
| 2018/0023168 A1 | 1/2018 | Yamaguma et al. | |

FOREIGN PATENT DOCUMENTS

| | | |
|---|---|---|
| KR | 1020170089934 A | 8/2017 |
| WO | 2012071629 A1 | 6/2012 |
| WO | 2013136941 A1 | 9/2013 |
| WO | 2015106324 A1 | 7/2015 |

OTHER PUBLICATIONS

Wei et al., "Selective iron sorption for on-line reclaim of chromate electroplating solution at highly acidic condition", Chemical Engineering Journal, 2015, pp. 434-443.

Gupta et al., "Extractive Metallurgy of Rare Earths", CRC Press, 2000, at p. 163.

Ritcey, "Development of Industrial Solvent Extraction Processes", Solvent Extraction Principles and Practices, 2nd Edition, 2004, pp. 277-337, edited by J. Rydberg, Marcel Dekker, Inc., New York.

Yadav et al., "Studies on separation of rare earths from aqueous media by polyethersulfone beads containing D2EHPA as extractant", Separation and Purification Technology, 2013, pp. 350-358, vol. 118.

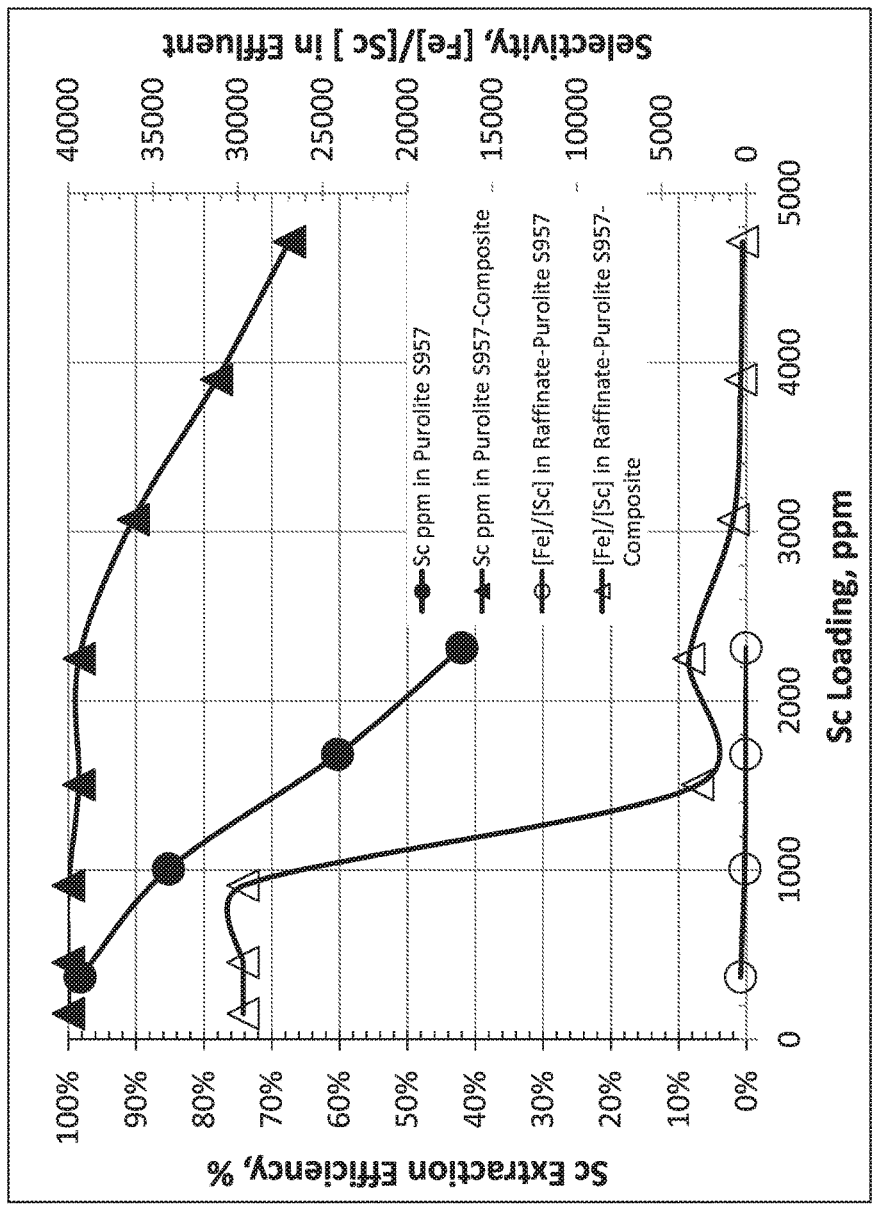
Figure 1. Column Process results of using Purolite S957 and Purolite S957-DEHPA for extracting rare earth metals from acid-leaching solution that contain a large amount of ferric ions.

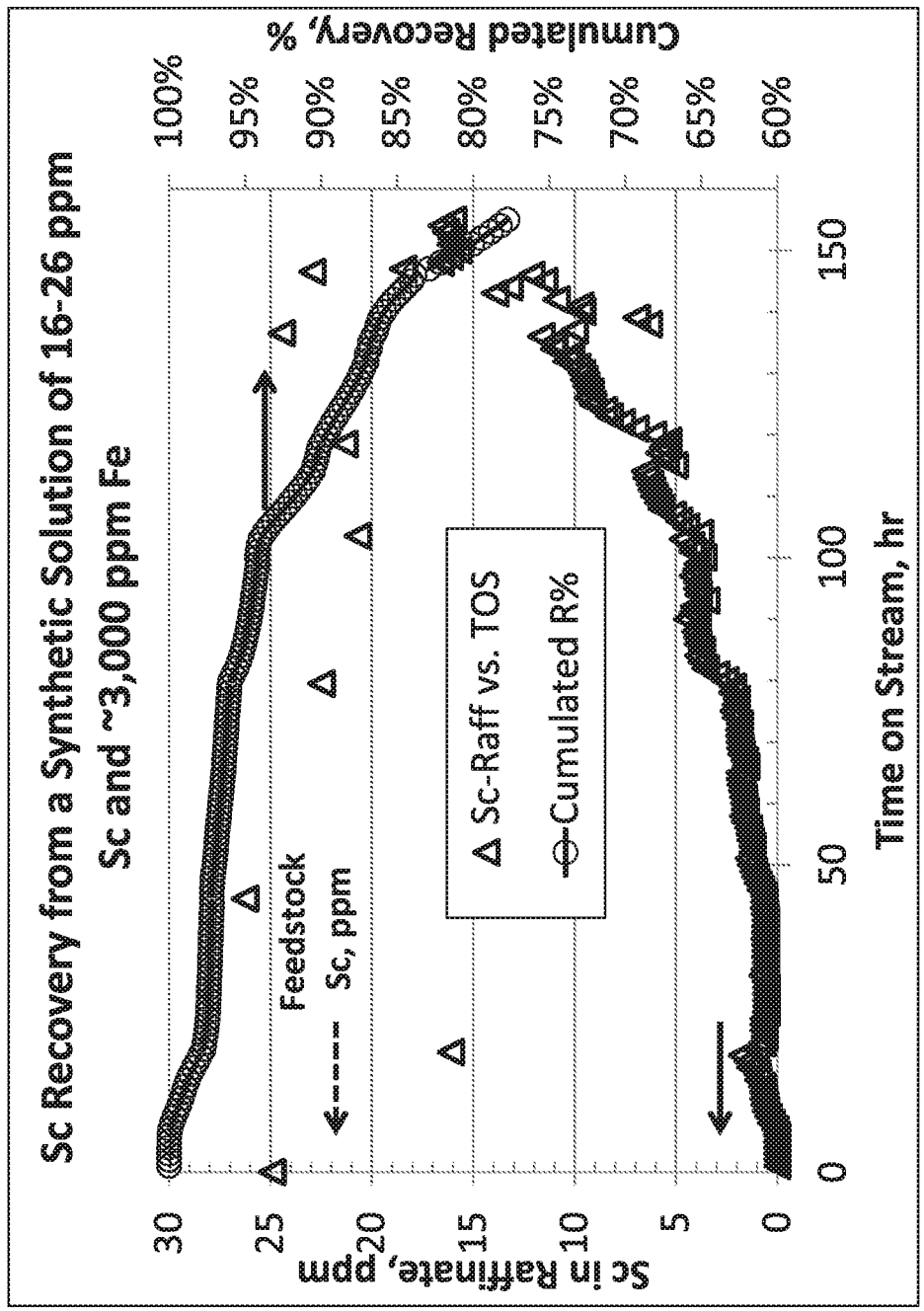
Figure 2. Column Process results of using Purolite S957-DEHPA (regenerated with multi-pass of acids, more expensive) for extracting rare earth metals from a HPAL Ni/Co Synthetic Solution that contain about 3,000 ppm ferric ions.

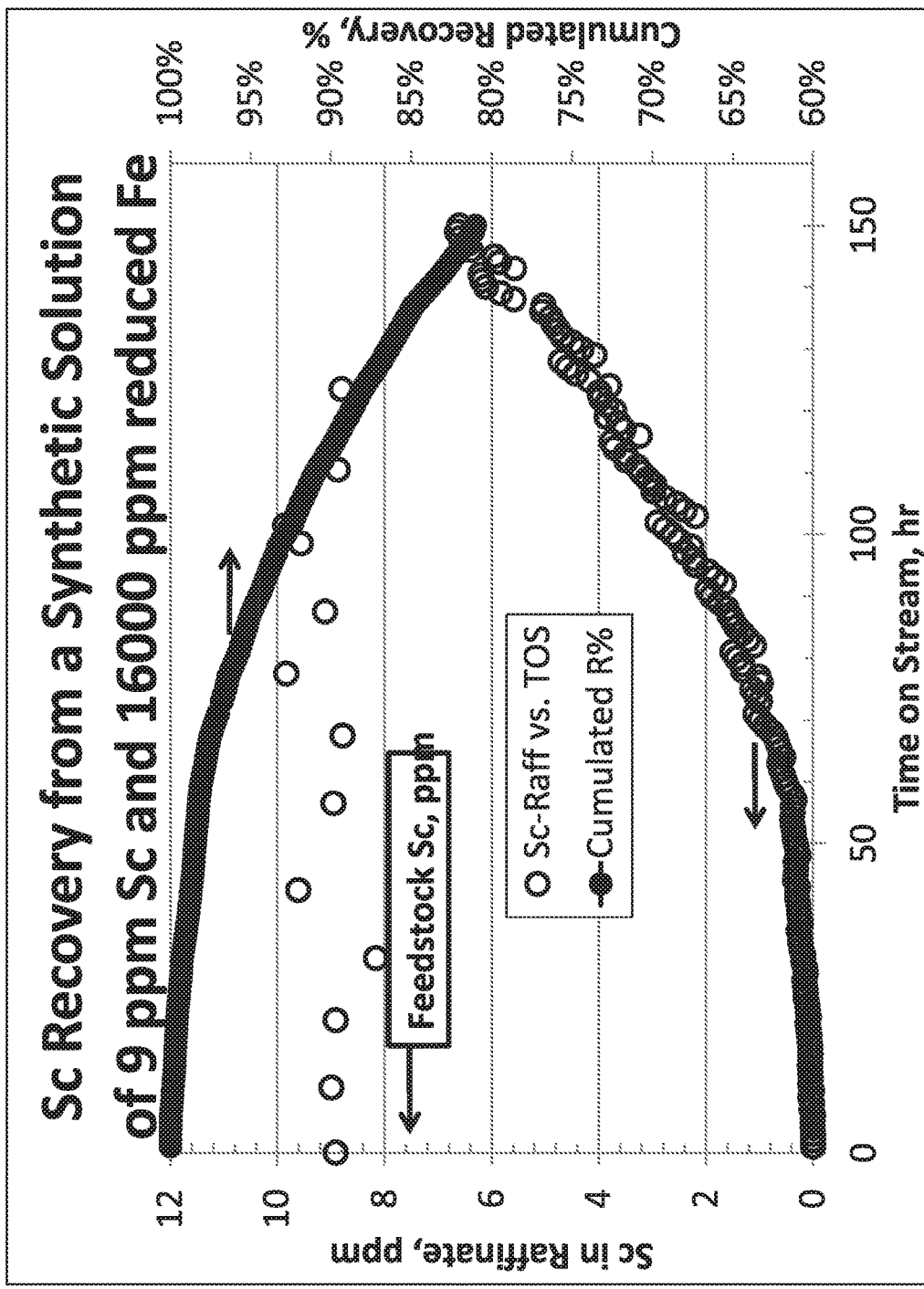
Figure 3. Column Process results of using Purolite S957-DEHPA (regenerated with multiple pass of acids, more expensive) for extracting rare earth metals from a Synthetic Solution that contains about 16,000 ppm iron ions.

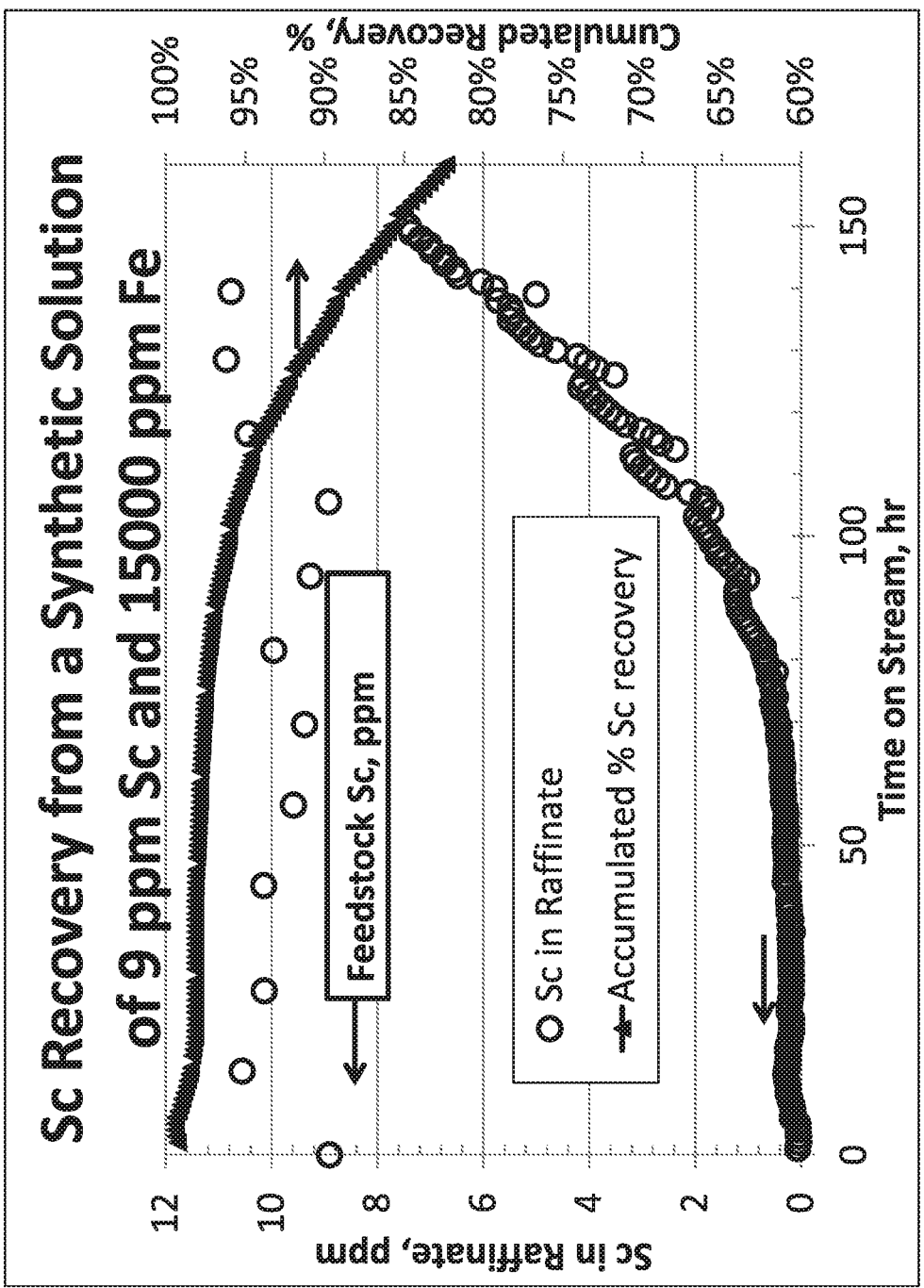
Figure 4. Column Process results of using Purolite S957-DEHPA (regenerated with one pass of acid, very economic) for extracting rare earth metals from a Synthetic Solution that contains about 15,000 ppm iron ions.

COMPOSITE EXTRACTANT-ENHANCED POLYMER RESIN, METHOD OF MAKING THE SAME, AND ITS USAGE FOR EXTRACTION OF VALUABLE METAL(S)

CROSS REFERENCE TO RELATED APPLICATION

This application claims priority to U.S. Provisional Application No. 62/248,473 filed on Oct. 30, 2015 and U.S. Provisional Application No. 62/269,174 filed on Dec. 18, 2015, the disclosures of which are hereby incorporated in their entirety by reference.

BACKGROUND OF THE INVENTION

Field of the Invention

The present invention is directed to a composite extractant-enhanced polymer resin, a method of making a composite extractant-enhanced polymer resin, and the use of a composite extractant-enhanced polymer resin for extraction of valuable metals, specifically, rare earth metals from an acid-leaching slurry and/or acid-leaching solution.

Description of Related Art

A. Solvent Extraction Process

Solvent extraction is widely used for recovering valuable metals that are dissolved in an aqueous solution, as disclosed in U.S. Pat. Nos. 4,041,125; 4,624,703; 4,718,996; 4,751,061; 4,808,384; 5,015,447; 5,030,424; 5,708,958; 6,110,433; 6,238,566; 7,138,643; 7,282,187; 7,799,294; 7,829,044; 8,062,614; 8,177,881; 8,328,900 and United States Patent Application Publication Nos. 2004/0031356; 2005/0107599; 2006/0024224; 2010/0089764; 2010/0282025; and 2012/0160061. The valuable metals are typically acid-leached into the aqueous solution from ores and/or other feedstock and a clear aqueous solution containing valuable metals is separated from the acid-leached ore slurry by filtration and washing. The solvent extraction is then performed on the clear aqueous solution.

The feedstock may include different rare earth metal-containing ores and minerals, such as titania ore tailing, uranium ore tailing, red mud that is typically generated from an aluminum Bauxite-Bayer process, and other such materials. In addition, the ore and/or feedstock that contain these valuable metals may be pre-processed for the purpose of achieving threshold leachability and commercial viability. Such processing may include particle-size reduction, hydrothermal treatments involving hydrothermal reactions, high-temperature treatments involving solid phase reactions, meta-glassy-phase high temperature reactions, complete melting high temperature liquid phase reactions, etc.

In the solvent extraction process, an organic liquid or solvent phase containing extractant(s) that can chemically react with a valuable metal or multiple valuable metals is well mixed with the aqueous solution that contains such valuable metal ion(s). The valuable metal ion or multiple valuable metal ions are then transferred into the organic phase of the extractive organic solvent during mixing. Intensive mixing ensures a complete transfer of the valuable metal ion(s) from the aqueous phase to the organic phase. After mass transfer of valuable metal(s) from the aqueous phase to the organic phase, the process typically undergoes a phase separation via gravitational settling or a high-g centrifugal phase separation mechanism, such as a centrifuge.

Industrially, a continuous process using a combination of (1) mixing an organic extractive solvent and an aqueous solution containing valuable metal(s) and (2) settling the mixture of such aqueous and organic phases for phase separation by gravity is called a mixer and settler process. Such a mixing and settling process can also be achieved with a batch process in a batch mixing tank in a manufacturing plant or in a beaker equipped with a magnetic stirrer or a mechanical mixer in a chemical lab. The separated organic phase is the desirable product that contains the valuable metals. The separated aqueous phase is called raffinate which, ideally, contains minimum amounts of the targeted valuable metal(s). When mixing the aqueous solution and the organic extractive solvent, intensive mixing can lead to emulsions, oil-in-water or water-in-oil. In the event of forming emulsions, the phase separation process may need to be extended to a level that is not economically feasible. In some cases, the formed emulsions might be stable enough such that economical phase separation is impossible, and, in other cases, phase separation may be incomplete, which results in a loss of valuable organic solvent and valuable metals contained in the lost organic solvent.

The process of obtaining a clear aqueous solution containing water-soluble valuable metal(s) by separating it from acid-leached ore slurries via filtration and washing may also result in low yield recovery of the valuable metal(s) and/or generation of a large volume of aqueous solution that contains low concentrations of valuable metal(s). Washing with an insufficient amount of water leads to a loss of significant amounts of residual valuable metal(s) that are still physically trapped in the residues of the filter cakes. In practical processes, a complete recovery of the valuable metals from the acid-leached ore slurries could never be achieved even if unlimited amounts of water could be used for thorough washing since partial amounts of the valuable metal ions are chemically bonded to the ion-exchangeable sites of the residues. And, even though thorough washing with unlimited amounts of water could theoretically reach a level of near complete recovery of the valuable metal(s) from the acid-leached ore slurries, thorough washing with unlimited water is impractical since it requires a downstream process, solvent extraction in this case, to process a huge volume of aqueous solutions that contain low concentrations of valuable metal(s). Use of such unlimited amounts of water also leads to issues related to the costs involved with disposing of such a huge volume of waste raffinate, not to mention the usage of a huge volume of fresh water resources.

In addition, in the prior art, direct solvent extraction of valuable metal(s) from a leached slurry in mixing tanks has not been practiced industrially due to issues of crud formation and emulsion formation. Crud formation occurs when, during the contact of the organic extractive solvent and the acid-leached ore slurries, some inorganic particles are bonded to the extractant molecules chemically and undesirably transferred into the organic phase along with the desirable mass transfer of the valuable metal ion(s) from the aqueous phase to the organic phase. Crud is defined in the art as the material resulting from the agitation of an organic phase, an aqueous phase, and fine solid particles that form a stable mixture (Gordon M. Ritcey, "Development of Industrial Solvent Extraction Processes" in the book *Solvent Extraction Principles and Practices*, second edition, revised and expanded, edited by Jan Rydberg, Michael Cox, Glaude Musikas, and Gregory R. Choppin and published by Marcel Dekker, Inc., pg. 313, 2004). Emulsions are classified into two different forms, oil-in-water and water-in-oil, both of which are typically formed under intense mixing conditions due to the formation of oil droplets in water or water droplets in oil. The droplet size of such newly formed emulsions decreases with the level of mixing. Intense mixing conditions lead to emulsions with smaller droplet sizes. The smaller droplets are more difficult to coagulate to form a continuous aqueous phase and a continuous organic phase. Therefore, emulsions of small droplets are stable, which then results in difficulties in phase separation. However, intensive mixing is critical to keep ore particles contained in the leached slurry suspended. Therefore, direct solvent extraction of valuable metal(s) from leached suspended-particle-containing ore slurries needs to be performed under intense mixing conditions, resulting in the formation of substantial emulsions, either in the form of water-in-oil or oil-in-water. This creates a practical dilemma that prevents successful implementation of direct solvent extraction of valuable metal(s) from leached ore slurries in a continuous mixer and settler process or in a batch tank process.

Lucas and Ritcey, inventors of U.S. Pat. No. 3,969,476, disclose a sieve-in-plate pulse column process, called the "solvent-in-pulp" process, in which soluble valuable metal(s) is extracted from ore slurries. Lucas and Ritcey also realize that up to the time of their patent disclosure, no process had run successfully on a plant scale for the recovery of valuable metal(s) directly from leached ore slurries. They also state that early work on mixer-settlers proved unsatisfactory because the excessive agitation caused stable emulsions and crud formation with amines (the extractant used in Lucas and Ritcey's disclosure). Even now, the common wisdom is that direct solvent extraction of valuable metal(s) from leached ore slurries in a mixer-settler process or a batch tank process cannot properly operate practically due to the excessive formation of crud and emulsions which form excessively in a continuous mixer-settler process and a batch-type mixing tank because the intensity of the mixing has to be strong enough to keep the acid-leached ore slurries suspended.

Even though Lucas and Ritcey's disclosure claims preliminary success in direct solvent extraction of valuable metal(s) from the leached ore slurries by using a sieve-in-plate pulse column process, the sieve-in-plate pulse column process still suffers critical limitations. One of the limitations is that any leached ore slurry has a very broad particle size distribution. Large particles may not be well-suspended and may plug the sieve holes of the column plates. Small particles might flocculate to form large particle agglomerates due to a lack of shear in the column and these large agglomerated particles might also plug the sieve holes of the column plates. Excessive sieve hole plugging by large particles normally accelerates with the time on stream to a point where the column has to be completely dissembled for cleaning, which is costly and tedious. The aforementioned limitations likely have led to no actual industrial adaptation of direct solvent extraction of valuable metal(s) from leached ore slurries using the sieve-in-plate pulse column process disclosed by Lucas and Ritcey more than three decades ago. Thus, current industrial standard practices still use organic solvents containing extractant(s) to extract valuable metals from clear aqueous solutions that are produced by filtering and washing the leached ore slurries.

After the issuance of U.S. Pat. No. 3,969,476, one of its inventors, Gordon M. Ritcey, published his article "Development of Industrial Solvent Extraction Processes" in the book "Solvent Extraction Principles and Practices", second edition, revised and expanded, edited by Jan Rydberg, Michael Cox, Glaude Musikas, and Gregory R. Choppin and published by Marcel Dekker, Inc., in 2004, and states on page 313 that "[s]olids must be absent from most solvent extraction circuits and clarification is usually aimed at achieving about 10 ppm of solids", which is 0.001% solids contents of the aqueous solution. In direct solvent extraction on the other hand, solids content of acid-leached ore slurries may be three to five magnitudes higher, from a few percent to as high as 50-70%.

Another limitation of Lucas and Ritcey's method is that the extractant molecules in the organic extractive solvent are of the amine type. Organic extractive solvents of the amine type are typically cationic and react with and bond to the anionic surface sites of silicate/silica-related residues in the ore slurry. Such bonding of the amine type extractive molecules in the organic extractive solvent to the anionic surface sites of the silica/silicate-related residues leads to a significant loss of the organic extractive solvent. Therefore, Lucas and Ritcey's process requires a pretreatment with organic non-ionic hydrophilic materials which are adsorbed by the gangue solids for the purposes of decreasing the affinity of the gangue solids for the amine; however, solvent loss still exists, which is a substantial cost for recovering valuable metal or metals from acid-leaching slurry that contains a very low concentration of valuable metal or metals.

In summary, solvent extraction process experiences more or less the problems of (1) solvent loss, (2) difficulties in achieving a complete organic-aqueous phase separation, (3) formation of emulsions, (4) crud formation, and (5) poor economics in dealing with a large volume of acid-leaching solution and/or acid-leaching slurry that contains a very low concentration of valuable metal or metals, etc.

B. Ion-Exchange Resin Process

As described in the book "Extractive Metallurgy of Rare Earths", by C. K. Gupta, N. Krishnamurthy, CRC Press, 2000, at page 163, an ion-exchange resin is typically considered as an ionic salt in which exchangeable ions are attached to an insoluble organic matrix. Such exchangeable ions in ion-exchange resins may be cations or anions, and the resins are referred to as a cation exchange resin or an anion exchange resin, respectively. Cation exchange resins may be used to uptake valuable metal ion(s) from acid-leaching solutions and/or acid-leaching slurries.

Typical ion exchange resins are categorized into strong resins, weak resins, and resins that lie between strong resins and weak resins. Dow Chemical produces strong cation ion-exchange resins that have sulfonic acid functional groups, such as Dowex™ G-26(H), and chelating cation ion-exchange resins that have iminodiacetic acid groups, such as Amberlite™ 7481. Purolite® produces a cation ion-exchange resin, Purolite® S957, that has a phosphoric acid functional group. Alkali ion forms, such as sodium forms, or proton forms of these resins may be used to uptake valuable metal or metals.

When an ion-exchange resin comes into contact with an aqueous solution/slurry that contains different electrolyte cations, the exchangeable ions of the ion exchange resin may be displaced; generally, (1) an ion of higher charge displaces an ion of lower charge, (2) between similarly charged ions, the ions of a large radius displaces the one of the smaller radius, and (3) the displacement occurs according to the law of mass action.

The majority of rare earth metal ions have chemical valences of 3+ in acid-leaching solutions and/or slurries;

however, such acid-leaching solutions and/or slurries contain very low concentrations of rare earth metal ions or valuable metal ions, while the majority of the soluble cations are $Fe^{3+}$, $Ti^{4+}$, $Zr^{4+}$, etc., plus alkali and alkali earth cations such as $Na^+$, $Ca^{2+}$, $Mg^{2+}$, etc. Selective uptake of rare earth metal ion(s), or valuable metal ion(s), over other cations, which are the majority of the cations in the acid-leaching solutions and/or slurries, is very challenging since cations like $Fe^{3+}$, $Ti^{4+}$, $Zr^{4+}$ have chemical valences higher than or similar to the rare earth metal ion(s) or valuable metal ion(s).

Strong cation ion-exchange resins were declared ineffective for selective uptake of useful rare earth metal ion(s) in U.S. Pat. No. 4,816,233 since the strong cation ion-exchange resin is quickly saturated by other cations ($Fe^{3+}$ and $Mn^{4+}$) in the acid-leaching solution and/or slurry from tungsten ore residues (containing about 632 ppm scandium in Example 1). U.S. Pat. No. 4,816,233 discloses a process of reducing $Mn^4$ and $Fe^{3+}$ ions into $Mn^{2+}$ and $Fe^{2+}$, respectively, by hydrazine hydrate, followed by adjusting the pH to about 2.0 and contacting the solution with Amberlite™ IRC-718, a chelating cation ion-exchange resin with iminodiacetic acid functional groups. However, such an acid-leaching solution has a ratio of iron to scandium of 173:1 and a ratio of manganese to scandium of 278:1, therefore, a large amount of hydrazine hydrate per unit of scandium (289 L/kg scandium) is used in the process. Hydrazine hydrate is a very expensive chemical, so the step of hydrazine hydrate reduction alone is costly, not to mention the other chemicals that are used in the leaching process and purification steps. Furthermore, feedstock, such as Ni/Co-containing ores (such as laterite) and red muds from aluminum bauxite process, only contain scandium at a level of less than 100 ppm, in most cases, or less than 200 ppm, in some cases, which makes this process cost-prohibitive due to the requirement for a large amount of hydrazine hydrate for reduction of ferric ions to ferrous ions.

Therefore, the present invention addresses the practical need for a new material/composition that allows a new process to extract valuable metals, such as rare earth metals, more particularly, scandium, from an acid-leaching slurry/solution that contains a very low concentration of valuable metal ions (rare earth metals, more particularly, scandium) and a very high concentration of ferric/titanium ions or other trivalent/tetravalent cations. Particularly, the embodiments of the present invention enable the economic recovery of valuable metals (rare earth metals, particularly, scandium) from feedstock that contains very low concentrations of said valuable metals without suffering the shortcomings of solvent extraction including solvent loss, difficulties in achieving a complete solvent-aqueous phase separation, formation of emulsions, crud formation, etc.

SUMMARY OF THE INVENTION

The present invention is directed to a composite comprising an extractant and a polymer resin. The extractant may be present in the composite in an amount of 80% or less, for example, 60% or less or 40% or less. The extractant may have cationic, non-ionic, and anionic functionalities and may comprise a cation extractant having at least one functional group selected from organophosphorus acids, carboxylic acids, and sulfonic acids or may comprise an anionic extractant having at least one amine functional group. The extractant may be at least one of di-(2-ethylhexyl)phosphoric acid (DEHPA), 2-ethyl-hexyl-2-ethyl-hexyl-phosphoric acid, tri-butyl phosphate, versatic acid, and versavic 10.

The polymer resin may be non-functional and/or functional. The non-functional polymer resin may be porous. The functional polymer resin may comprise at least one functional group selected from phosphoric acid groups, sulfonic acid groups, iminodiacetic acid, carboxylic acid groups, and amines. The composite may have a density of 0.3-1.3 g/ml.

The present invention is also directed to a method of making the above-described composite extractant-enhanced polymer resin. An extractant solution is prepared. A polymer resin is soaked in the extractant solution to form a composite extractant-enhanced polymer resin. Then, the composite extractant-enhanced polymer resin is separated from the extractant solution. The extractant solution may comprise phosphorus-containing molecules, such as, di-(2-ethylhexyl)-phosphoric acid (DEHPA) and may include a solvent and/or a modifier. The composite extractant-enhanced polymer resin is separated by filtration or screening resulting in a wet form of the composite. The composite may optionally be dried in air or in an oven to prepare a dry form of the composite.

The present invention is also directed to the use of the above-described composite extractant-enhanced polymer resin, to directly extract rare earth metals from an acid-leaching slurry and/or acid-leaching solution in which iron ions are present as ferric cations or the ferric ions are reduced to ferrous ions. An aqueous acid-leaching slurry or an acid-leaching solution containing rare earth metal ions is provided, and a composite comprising an extractant and a polymer resin is added to the slurry or solution. The composite is mixed with the slurry or solution to form a mixture slurry or solution, and the mixture slurry or solution is separated into a rare-earth-metal-loaded composite and a raffinate slurry or solution. The method may further comprise stripping the rare earth metals from the rare-earth-metal-loaded composite and/or regenerating the composite for reuse. The method may be carried out in one of a batch reactor or in a column process.

After mixing, the composite may be loaded with at least 200 wt. ppm of rare earth metal or at least 0.2 grams of rare earth metal per liter of composite.

The present invention is also directed to a method for extracting rare earth metals from an acid-leaching slurry or an acid-leaching solution comprising mixing the above described composite with an aqueous acid-leaching slurry or acid-leaching solution to form a mixture slurry or solution, wherein, after mixing, the composite is loaded with at least 200 wt. ppm of rare earth metal or at least 0.2 grams of rare earth metal per liter of composite.

The present invention is also directed to the use of a cation-exchange resin comprising phosphoric acid functional groups to directly extract rare earth metals from an acid-leaching slurry and/or acid-leaching solution. An aqueous acid-leaching slurry or an acid-leaching solution containing rare earth metal ions is provided, and a cation-exchange resin comprising phosphoric acid functional groups is added to the slurry or solution. The cation-exchange resin is mixed with the slurry or solution to form a mixture slurry or solution, and the mixture slurry or solution is separated into a rare-earth-metal-loaded cation-exchange resin and a raffinate slurry or solution. The method may further comprise stripping the rare earth metals from the rare-earth-metal-loaded cation-exchange resin and/or regenerating the cation-exchange resin for reuse. The method may be carried out in one of a batch reactor or in a column process.

BRIEF DESCRIPTION OF THE DRAWINGS

FIG. 1 is a graph comparing scandium recovery when using a polymer resin having phosphoric acid functional groups and when using a composite extractant-enhanced polymer resin according to the present invention in a column process for extracting rare earth metals from an acid-leaching solution that contains a large amount of ferric ions (Example 31);

FIG. 2 is a graph showing scandium recovery when using a composite extractant-enhanced polymer resin according to the present invention in a column process for extracting rare earth metals from an acid-leaching solution that contains a large amount of ferric ions (Example 32);

FIG. 3 is a graph showing scandium recovery when using a composite extractant-enhanced polymer resin according to the present invention in a column process for extracting rare earth metals from an acid-leaching solution that contains a large amount of ferric ions (Example 33); and FIG. 4 is a graph showing scandium recovery when using a composite extractant-enhanced polymer resin according to the present invention in a column process for extracting rare earth metals from an acid-leaching solution that contains a large amount of ferric ions (Example 34);

DESCRIPTION OF THE INVENTION

As used herein, unless otherwise expressly specified, all numbers such as those expressing values, ranges, amounts or percentages may be read as if prefaced by the word "about", even if the term does not expressly appear. Any numerical range recited herein is intended to include all sub-ranges subsumed therein. For example, a range of "1 to 10" is intended to include any and all sub-ranges between and including the recited minimum value of 1 and the recited maximum value of 10, that is, all subranges beginning with a minimum value equal to or greater than 1 and ending with a maximum value equal to or less than 10, and all subranges in between, e.g., 1 to 6.3, or 5.5 to 10, or 2.7 to 6.1. Plural encompasses singular and vice versa. When ranges are given, any endpoints of those ranges and/or numbers within those ranges can be combined with the scope of the present invention. "Including", "such as", "for example" and like terms means "including/such as/for example but not limited to".

Preparation of a Composite Extractant-Enhanced Polymer Resin

The present invention is directed to a composite comprising an extractant and a polymer resin.

Any suitable extractant may be used to prepare the composite extractant-enhanced polymer resin. The extractant may be anionic, cationic, or non-ionic. Such extractants include, but are not limited to, a cation exchange extractant such as organophosphorous acids, sulfonic acids, and carboxylic acids, a neutral extractant such as tri-n-butyl-phosphate, and an anion exchange extractant such as the amines. A primary industrial extractant comprises di-(2-ethylhexyl)-phosphoric acid (DEHPA), 2-ethyl-hexyl-2-ethyl-hexyl-phosphoric acid (EHEHPA), tributyl-phosphate (TBP), versatic acid, versatic 10, and Aliquat 336. For example, phosphorus-containing molecules may be used as the extractant to enhance the ability of the polymer resin to extract valuable metals such as rare earth metals or di-(2-ethylhexyl)-phosphoric acid (DEHPA) may be used as the extractant for preparing a composite DEHPA-enhanced polymer resin.

The extractant may be used in its original form for preparation of a composite extractant-enhanced polymer resin, or may optionally be diluted by a solvent or modified by a modifier prior to use. Suitable optional solvents used for dilution include, but are not limited to, water, alcohol, ester, ether, ketone, hydrocarbon, and combinations thereof. Suitable optional modifiers include, but are not limited to, isodecanol, coconut alcohol, octanol, ethylhexyl alcohol, alcohol(s) containing six or more carbons, and combinations thereof.

Any suitable polymer resin may be used for the preparation of the composite extractant-enhanced polymer resin. The polymer resin may be synthetic or natural. The polymer resin may be non-functional and porous. For example, non-functional and porous polymers include, but are not limited to, Dow's Amberlite™ XAD7HP, Amberlite™ XAD1180N, Amberlite™ M XAD2, Amberlite™ XAD4, and Amberlite™ XAD 16N. The polymer resin may also be functional. The functional group may include, but is not limited to, sulfonic acid, iminodiacetic acid, carboxylic acid, phosphoric acid, and amine. Functional polymer resins that have sulfonic acid functional group(s) include, but are not limited to, Dow's Amberlite™ IRC-120 and Dowex™ G-26 (H). Functional polymer resins that have carboxylic acid functional groups include, but are not limited to, Amberlite™ FPC-3500 and Amberlite™ IRC-86SB. Functional polymer resins that have phosphoric acid functional groups include, but are not limited to, Purolite® S957, Monophosphonix, and Diphosphonix.

The composite extractant-enhanced polymer resin may contain 80 wt. % or less of the extractant, for example, 60 wt. % or less of the extractant, or 50 wt. % or less of the extractant.

The composite extractant-enhanced polymer resin may be prepared by soaking the polymer resin in a pure extractant liquid or in a mixture solution comprising extractant and organic solvent, followed by filtration and washing. The solvent may be a low carbon alcohol such as ethanol and isopropanol or may be ketone, ether, and/or another organic solvent.

The wet extractant-enhanced polymer resin may have a density of at least 0.3 g/ml and up to 1.30 g/ml, for example, 0.3-1.3 g/ml, 0.4-1.1 g/ml, or 00.5-1.1 g/ml.

Extraction of Rare Earth Metals from Acid-Leaching Slurries or Acid-Leaching Solutions The prepared composite extractant-enhanced polymer resin, in a wet form, may be used directly for extracting the valuable metals from an acid-leaching slurry or an acid-leaching solution, or may be dried in air or in an oven at a temperature that is not detrimental to the resin and extractant and then used for extraction. For example, the drying temperature may be ≤200° C., ≤150° C., ≤120° C., ≤100° C., ≤80° C., or room temperature.

Direct extraction of rare earth metals, including scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu) using the composite extractant-enhanced polymer resin may be carried out in a batch operation or continuously.

An aqueous acid-leaching slurry or solution containing one or more rare earth metals is combined in a mixing tank with the composite extractant-enhanced polymer resin prepared as described above. An aqueous acid-leaching solution is the liquid resulting from filtration of an acid-leaching slurry or from the separation of the liquid and solid components of an acid leaching slurry using any liquid-solid separation method.

The feedstock for the slurry is any ore, mineral, or residues that contain rare earth metals in trace amounts up to 50,000 ppm, for example up to 10,000 ppm, up to 1,000 ppm, up to 500 ppm, or up to 500 ppm. Feedstock materials include, but are not limited to, rare earth-metal-containing minerals such as thorteveitite, bastrasite, monazite, xenotime, Allanite, apatite, brannerite, eudialyte, euxenite, Fergusonite, Florencite, gadolinite, laparite, perovskite, pyrochlore, zircon, Wolframite, bazzite, Kolbeckite, jervisite, cascandite, juonnite, pretulite, scandiobingtonite, Kristiansenite, red mud, titanium tailing, tungsten tailing, uranium tailing, and cobalt and nickel minerals, such as laterites. The feedstock may be ground into a fine particulate and mixed with water and at least one suitable acid for dissolving metals in the ore. Suitable acids may include, but are not limited to, mineral acids including sulfuric acid, hydrochloric acid, and nitric acid. The leaching may be carried out at a temperature equal to or less than the boiling point of water, for example, 100° C. or below or 80-100° C., or under hydrothermal conditions at a temperature of up to 300° C., while the solution is thoroughly mixed, for example, at 145-150 rpm, or under static conditions.

The aqueous acid-leaching slurry may have a viscosity of 400 centipoise or less, for example, a viscosity of 100 centipoise or less or a viscosity of 20 centipoise or less.

The pH of the aqueous acid-leaching slurry and/or acid-leaching solution is not limited, but should be sufficient to prevent partial or complete precipitation of the rare earth metals. The pH of the aqueous acid-leached ore slurry or solution, therefore, may be up to 6.5, for example, up to 4.0.

The aqueous acid-leaching slurry and/or solution may comprise iron in the form of ferric ions and/or ferrous ions. Feedstock such as red mud, titanium tailing, uranium tailing, cobalt and nickel minerals such as laterites, and other such rare earth metal-containing ores or minerals may contain a certain level of iron, and sometimes, iron may even be a major component of the feedstock, such as red mud from an aluminum Bauxite-Bayer process. During the acid-leaching process, iron is dissolved by the acid to form ferric ions, which compete with the rare earth metal ions for the extractant molecules in the composite extractant-enhanced polymer resin. Ferric ions may be chemically reduced to ferrous ions prior to adding the composite extractant-enhanced polymer resin.

The amount of composite extractant-enhanced polymer resin used may be dictated by the targeted recovery of the targeted valuable metal ion(s). The ratio of the volume of the acid-leaching slurry or solution to the volume of composite extractant-enhanced polymer resin may vary accordingly to the properties of the slurry or solution, particularly, the concentrations of ferric ions, titanium ions, and the targeted valuable metal ions. The ratio of the volume of the acid-leaching slurry or solution to the volume of composite extractant-enhanced polymer resin may be at least 0.5 and up to 3000, for example, at least 1 and up to 2000.

The combination of the composite extractant-enhanced polymer resin and the acid-leaching slurry or solution is then mixed for at least a few minutes, for example, one hour or longer. Mixing may be accomplished using any suitable method including, but not limited to, a mixing bar, a paddle stirrer, a pump, and air-bubbling.

For aqueous acid-leaching slurries and/or solutions, the direct extraction of the rare earth metals may be carried out at room temperature or at an elevated temperature up to the boiling point of water, for example, 100° C. When elevated temperatures are used the extraction rate is accelerated.

After mixing, the composite extractant-enhanced polymer resin may be loaded with at least 2,000 wt. ppm, for example, at least 1,800 wt. ppm, at least 1,600 wt. ppm, at least 1,400 wt. ppm, at least 1,200 wt. ppm, at least 1,000 wt. ppm, at least 800 wt. ppm, at least 600 wt. ppm, at least 400 wt. ppm, or at least 200 wt. ppm of rare earth metal, such as scandium. In other terms, after mixing, the composite extractant-enhanced polymer resin may be loaded with at least 0.2 grams of rare earth metal, for example, scandium, per liter of wet composite extractant-enhanced polymer resin, for example, at least 0.4 grams of rare earth metal per liter of wet composite extractant-enhanced polymer resin, at least 0.8 grams of rare earth metal per liter of wet composite extractant-enhanced polymer resin, at least 1.2 grams of rare earth metal per liter of wet composite extractant-enhanced polymer resin, or at least 1.4 grams of rare earth metal per liter of wet composite extractant-enhanced polymer resin.

Separation of the valuable-metal-loaded composite extractant-enhanced polymer resin from the raffinate slurry and/or solution may be accomplished by gravitational settling, screening, filtering, or other appropriate processes.

The valuable-metals from the loaded extractant-enhanced polymer resin may be stripped from the composite extractant-enhanced polymer using a stripping solution comprising an acid, a base, a salt, or a chelating agent to form a solution or slurry that contains valuable metals such as rare earth metals. The acid may comprise a typical mineral acid and/or an organic acid, or a mixture of mineral acids and/or organic acids, for example, the acid may be, but is not limited to, hydrochloric acid, nitric acid, sulfuric acid, phosphoric acid, acetic acid, formic acid, and the like. The base may comprise a typical alkali metal base (such as, but not limited to, sodium hydroxide, potassium hydroxide, lithium hydroxide, and the like), an alkali earth metal base (such as, but not limited to, magnesium hydroxide, calcium hydroxide, barium hydroxide, and the like), an ammonium hydroxide, an organic amine which may be a primary amine, a secondary amine, a tertiary amine, and/or mixtures thereof. The salt may comprise any type of salt, for example, a salt that allows the dissolution of the rare earth metal in an aqueous solution, such as, a carbonate salt, for example, sodium carbonate, sodium bicarbonate, potassium carbonate, potassium bicarbonate, lithium carbonate, lithium bicarbonate, ammonium carbonate, and ammonium bicarbonate. The salt, the base, and/or the acid, may be used together, separately, or as a mixture. For example, a carbonate or bicarbonate salt may be used with a hydroxide base, such as, a mixture of sodium carbonate and sodium hydroxide, sodium carbonate and potassium carbonate, potassium carbonate and sodium carbonate, potassium carbonate and potassium hydroxide, and ammonium carbonate and ammonium hydroxide.

The acid, the base, and/or the salt, may be included in the stripping solution at a concentration of at least one gram per liter and up to the saturated solubility of the acid, base, or salt in the stripping solution, for example, up to 350 grams per liter. For example, the concentration of sodium carbonate may be at least 1 gram per liter and up to the solubility of sodium carbonate. The solubility of sodium carbonate increases with temperature and is about 164 grams per liter at 15° C. and 340 gram per liter at 27° C.

The stripping process may be performed at any suitable temperature as long as the rare earth metal can be removed from the resin. For the sake of economics and the safety and speed of the stripping process, the process may be carried out at room temperature or at an elevated temperature up to the boiling point of the stripping solution, for example, 100° C. Stopping may also be carried out at a temperature below room temperature, but the process will be slower and less economical.

The stripping process may be carried out in a batch process or in a continuous process, ex-situ or in-situ.

For achieving near-complete stripping of the rare earth metal from the loaded resin, the stripping process may be repeated as many times as is needed to achieve the desired objective. However, the stripping of rare earth metal from the loaded resin can be partial and does not have to be complete.

The valuable metals and other impurities in the stripping solution may be precipitated with an acid such as, but not limited to, hydrochloric acid, sulfuric acid, nitric acid, phosphoric acid, or an organic acid, followed by filtration, to produce a filtered cake. The filtered cake may be further purified to a scandium chemical or metal that has a purity greater than 30%, for example, greater than 50%, greater than 70%, greater than 90%, greater than 95%, greater than 99%, greater than 99.9%, greater than 99.99%, or greater than 99.999%. The chemical may be hydroxide, oxide, oxalate, fluoride, chloride, or other valuable chemicals. Scandium metal may be used to produce an alloy with aluminum, copper, or other metal(s). Scandium-contained materials may be used in ceramics for fuel-cells, optics, catalysts, pharmaceuticals, automobiles, aerospace, etc.

The composite extractant-enhanced polymer resin after stripping may be used directly or may be regenerated with a solution comprising an acid or a mixture of acids, for example, hydrochloric acid (HCl), sulfuric acid ($H_2SO_4$), nitric acid ($HNO_3$), phosphoric acid ($H_3PO_4$), and/or an inorganic/organic acid and recycled for use in the next batch or cycle. The regeneration solution may have an acid concentration of at least 1 gram per liter and up to 500 grams per liter, or may be a pure concentrated acid (such as concentrated hydrochloric acid, typically 36-37 wt. %, concentrated nitric acid, 68-70 wt. %, or concentrated sulfuric acid, up to 98 wt. %).

The regeneration process may be carried out in-situ or ex-situ. The regeneration process may be a batch process or a continuous process. The regeneration process may be performed more than once. In a multiple pass regeneration process, different type of acids may be used. Sometimes, the regeneration solution may comprise an additive, such as, but not limited to, a surfactant, a reducing agent, and an oxidizing agent.

Alternatively, a continuous process may be used. The composite extractant-enhanced polymer resin may be placed in a column to form a resin bed. Acid-leaching slurry or solution may be continuously pumped through the resin bed at a flow rate ranging from at least one tenth of a bed volume per hour up to 30 bed volumes per hour, for example, from one bed volume per hour to 100 bed volumes per hour. The raffinate solution exiting the resin bed may be monitored to determine when the composite extractant-enhanced polymer resin begins to lose its efficiency for extracting the valuable metals. The valuable-metals from the loaded extractant-enhanced polymer resin may be removed as described above.

The following examples are illustrative of the process:

Comparative Example 1

Acid-leached ore slurries containing valuable metals, in this case, scandium and other rare earth metals, which may be completely water-soluble or may be chemically bonded to ion-exchangeable sites of inorganic residues in the feedstock, are typically produced in 7000-liter fiber glass-reinforced plastic (FRP) reactors, according to the general disclosures in the previously referenced patents. The feedstock, the water, and the acid, in this case, sulfuric acid or hydrochloric acid, are mixed at 144 rpm with 12" triple blades that pump the slurry downwards at a temperature of 80-100° C. Such leaching slurries have a pH between 0.0 and 0.5. In this example, the composition of the acid-leaching slurry was analyzed (inductively coupled plasma-optical emission spectroscopy (ICP-OES) method) by (1) concentrated hydrochloric acid digestion, (2) volumetric dilution, and (3) filtration for residue removal, and the obtained elemental results are tabulated in Table 1. It should be noted that the analytical results for sodium, potassium, aluminum, silicon, and indium are not precise; however, it is believed that the sample does contain these elements. Also, it should be noted that the acid-leaching slurry in this example contains a substantial amount of trivalent and tetravalent cations, particularly $Fe^{3+}$ and $Ti^4$, as compared to the valuable metals, such as the rare earth metals, and more specifically, $Sc^{3+}$. The molar ratio of $([Fe^{3+}]+[Ti^{4+}])$ to $[Sc^{3+}]$ in the slurry of this example is more than 75.3:1.

In the prior art extraction process, the aqueous acid-leached slurry undergoes a normal solid-liquid separation process and filtration to produce a liquid filtrate which contains the rare earth metals and solid filter cakes of the leaching residues, which are generally waste material. The filter cakes of the leaching residues are typically washed by fresh water in a volume that is equivalent to one volume of the filter press volume. The filtrate stream and washing stream are then combined into a product stream. Additional washing with fresh water in a volume that is equivalent to four volumes of the filter press leads to the formation of very large amounts of the washing filtrate that has such low concentrations of rare earth metals that it is not economically viable. Even with a thorough washing with fresh water in a volume that is equivalent to five times the volume of the filter press, there are still substantial amounts of rare earth metals left in the residue, as free metal ions are trapped inside the filter cakes or bonded to the ion-exchangeable sites of the leaching residues. Therefore, the conventional process of acid-leaching followed by filtration and washing may recover 60% to 80%, or less, of the rare earth metals. In addition to filtering and washing, solvent extraction of the filtrate is needed to recover the rare earth metals.

The above described leaching procedure was used to prepare different acid-leaching slurries in lab beakers and in plant scale reactors and will not be repeatedly described; this acid-leaching slurry was used for carrying out the following comparative examples and examples.

Comparative Example 2: Direct Extraction of Scandium from an Aqueous Acid-Leaching Slurry with a Strong Cation Ion-Exchange Resin Containing a Sulfonic Acid Functional Group, Dowex™ G-26 (H)

1 gram of Dowex™ G-26(H) strong cation ion-exchange resin (as is) containing sulfonic acid functional groups was weighed into a 150-mL beaker having a magnetic bar stirrer. 25 mL of feedstock acid-leaching slurry from Comparative Example 1 was added to the beaker. The resin and slurry mixture was agitated with the magnetic stirrer for about one hour. The resin and slurry mixture was then filtered to produce a raffinate filtrate. The filtrate was analyzed with ICP-OES, and the results are tabulated in Table 1. The concentration of scandium was only reduced from 95.9 ppm in the feedstock slurry to 90.5 ppm in the raffinate filtrate, with a recovery of only about 5.6%. Without reduction of ferric ions to ferrous ions, the strong cation ion-exchange resin having sulfonic acid groups was quickly saturated by the ferric ions and other high-valance metal ions ($Ti^{4+}$), and the resin became inactive for selective uptake of scandium ions from the acid-leaching slurry.

Comparative Example 3: Direct Extraction of Scandium from an Aqueous Acid-Leaching Slurry with a Weak Cation Ion-Exchange Resin, Amberlite™ IRC-7481

1 gram of Amberlite™ IRC-7481 cation ion-exchange resin (as is) containing iminodiacetic acid functional groups was weighed into a 150-mL beaker having a magnetic bar stirrer. 25 mL of feedstock acid-leaching slurry from Comparative Example 1 was added to the beaker. The resin and slurry mixture was agitated with the magnetic stirrer for about one hour. The resin and slurry mixture was then filtered to produce a raffinate filtrate. The filtrate was then analyzed with ICP-OES, and the results are tabulated in Table 1. The concentration of scandium was only reduced from 95.9 ppm in the feedstock slurry to 93.1 ppm in the raffinate filtrate, with a recovery of only about 2.9%. Without reduction of ferric ions to ferrous ions, the chelating cation ion-exchange resin having iminodiacetic acid groups was quickly saturated by the ferric ions and other high-valance metal ions ($Ti^{4+}$), so the resin became inactive for selective uptake of scandium from the acid-leaching slurry, which further confirms the conclusions from U.S. Pat. No. 4,816,233 that cation exchange resins (Amberlite™ IRC-7481) containing functional groups of iminodiacetic acid, similar to the Amberlite™ IRC-718 used in U.S. Pat. No. 4,816,233, are not effective to uptake scandium when the molar ratio of ($[Fe^{3+}]+[Ti^{4+}]$) to $[Sc^{3+}]$ is high, for example, in the feedstock slurry more than 75.3:1. In the patent disclosure of U.S. Pat. No. 4,816,233, trivalent $Fe^{3+}$ and tetravalent $Mn^{4+}$ were reduced to divalent $Fe^{2+}$ and $Mn^{2+}$ ions which allowed selective uptake of scandium ions by Amberlitem™ 718 (iminodiacetic acid functional groups).

Example 4: Direct Extraction of Scandium from an Aqueous Acid-Leaching Slurry with an Ion-Exchange Resin Having Phosphoric Functional Groups, Purolite® S957

DEHPA (di-2-ethylhexyl phosphoric acid) is a very effective liquid extractant, as discussed in the Description of Related Art. It is typically diluted with a hydrocarbon solvent, such as diesel, kerosene, or mineral spirits, and provided with a modifier of a high molecular weight alcohol. However, solvent extraction with a liquid organic extractant suffers shortcomings such as solvent loss, crud formation, emulsions, and difficulty in achieving a complete organic-aqueous phase separation. To overcome these shortcomings of solvent extraction, the present invention utilizes an immobilized extractant that has functional groups that are similar to those of DEHPA. Purolite S957 is one commercial product that contains phosphoric acid functional groups which are chemically bonded to the polymer matrix. The immobilized phosphoric acid functional groups in the cation exchange resin, Purolite® S957, have been found to perform similarly in extracting valuable metal(s), such as rare earth metals, without suffering the aforementioned shortcomings of solvent extraction involving liquid organic solvent.

1 gram of Purolite® S957 cation ion-exchange resin (as is) containing phosphoric acid functional groups was weighed into a 150-mL beaker having a magnetic bar stirrer. 25 mL of feedstock acid-leaching slurry from Comparative Example 1 was added to the beaker. The resin and slurry mixture was agitated with the magnetic stirrer for about one hour. The resin and slurry mixture was then filtered to produce a raffinate filtrate. The filtrate was then analyzed with ICP-OES, and the results are tabulated in Table 1. The concentration of scandium was reduced from 95.9 ppm in the feedstock slurry to 38.1 ppm in the raffinate filtrate, for a recovery of about 60.3%, much better than Dowex™ G-26(H) and Amberlite™ IRC-7481. Without reduction of ferric ions to ferrous ions, the cation ion-exchange resin of Purolite S957 that has phosphoric acid groups can selectively uptake scandium from the acid-leaching slurry, although not completely.

Though Purolite® S957 containing phosphoric acid functional groups performs superiorly over both Dowex™ G-26 (H) containing sulfonic acid functional groups and Amberlite™ IRC-7481 containing iminodiacetic acid functional groups, a 60.3% recovery of scandium needs to be further improved for a commercially viable process. It has been found that, as illustrated in the following examples, a composite extractant-enhanced polymer resin can be utilized to successfully achieve a higher than 60% scandium recovery and at the same time, successfully overcome the shortcomings of solvent extraction, such as solvent loss, difficulties in achieving a complete organic-aqueous phase separation, emulsions, and crud formation.

TABLE 1

ICP-OES Analytical Results for Feedstock and Raffinate Slurries from Comparative Examples 1-3 and Example 4

| Example | | Li | Be | B | Na | Mg | Al | Si | P |
|---|---|---|---|---|---|---|---|---|---|
| Comp. Example 1 | Feedstock | 55.6 | <0.812 | 16.14 | >1562 | 315.3 | 432.9 | 226.3 | 5220 |
| Comp. Example 2 | DOWEX™ G-26(H) | 68.6 | 1.537 | 15.53 | <68.3 | 272.5 | 226.3 | 303.8 | 351.4 |
| Comp. Example 3 | Amberlite™ IRC-7481 | 53.8 | 1.686 | 15.52 | <68.3 | 307.4 | 427.3 | 315.9 | <29.31 |
| Example 4 | Purolite® S957 | 82.5 | <0.812 | 15.07 | <68.3 | 307.3 | 378.7 | 325.8 | 826 |

| | | S | K | Ca | Sc | Ti | V | Cr | Mn |
|---|---|---|---|---|---|---|---|---|---|
| Comp. Example 1 | Feedstock | >51283 | 955 | 1103 | 95.9 | 916 | 11.9 | 22.69 | 212.2 |
| Comp. Example 2 | DOWEX™ G-26(H) | >49812 | 418.6 | 911 | 90.5 | 871 | 11.43 | 20.32 | 187.7 |
| Comp. Example 3 | Amberlite™ IRC-7481 | >49408 | <24.94 | 1067 | 93.1 | 883 | 11.6 | 21.99 | 205.3 |

TABLE 1-continued

ICP-OES Analytical Results for Feedstock and Raffinate
Slurries from Comparative Examples 1-3 and Example 4

| | | | | | | | | |
|---|---|---|---|---|---|---|---|---|
| Example 4 | Purolite ® S957 | >82558 | 901 | 1078 | 38.13 | 292.7 | 11.81 | 23.1 | 216.1 |

| | | Fe | Co | Ni | Cu | Zn | Ga | As | Sr |
|---|---|---|---|---|---|---|---|---|---|
| Comp. Example 1 | Feedstock | >7944 | 4.758 | 10.32 | 7.41 | 14.7 | 5.38 | 2.897 | 6 |
| Comp. Example 2 | DOWEX ™ G-26(H) | >9367 | 5.81 | 9.25 | 6.95 | 13.58 | 3.712 | <2.632 | 5.73 |
| Comp. Example 3 | Amberlite ™ IRC-7481 | >7689 | 5.59 | 9.75 | 7.18 | 14.48 | 6.71 | <2.632 | 5.91 |
| Example 4 | Purolite S957 | >6580 | 4.19 | 9.02 | 7.18 | 14.63 | 4.822 | 6.38 | 5.69 |

| | | Y | Zr | Nb | Mo | Cd | In | Sn | Ba |
|---|---|---|---|---|---|---|---|---|---|
| Comp. Example 1 | Feedstock | 27.03 | 21.94 | 7.41 | 3.813 | 2.13 | 1416 | <0.846 | 3.671 |
| Comp. Example 2 | DOWEX ™ G-26(H) | 21.45 | 21.31 | 7.88 | 2.726 | 2.612 | 1017 | <0.846 | 3.645 |
| Comp. Example 3 | Amberlite ™ IRC-7481 | 26.33 | 20.72 | 6.33 | 3.732 | 2.508 | 1134 | <0.846 | 3.664 |
| Example 4 | Purolite ® S957 | 27.69 | 6.88 | 6.23 | 2.451 | 2.403 | 621 | <0.846 | 3.717 |

| | | La | Hf | W | Hg | Pb | Bi | Ce | Nd |
|---|---|---|---|---|---|---|---|---|---|
| Comp. Example 1 | Feedstock | 2.948 | <0.761 | <0.2856 | 4.2 | 640 | <3.527 | 92.3 | 7.21 |
| Comp. Example 2 | DOWEX ™ G-26(H) | 1.793 | 0.789 | 0.667 | 1.744 | >1907 | <3.527 | 65.2 | 6.09 |
| Comp. Example 3 | Amberlite ™ IRC-7481 | 2.66 | <0.761 | <0.2856 | 4.786 | >1730 | 5.63 | 88.8 | 7.76 |
| Example 4 | Purolite S957 | 2.815 | <0.761 | 1.081 | 2.972 | 494.4 | 4.545 | 95.5 | 7.47 |

| | | Sm | Gd | Yb | Th | U |
|---|---|---|---|---|---|---|
| Comp. Example 1 | Feedstock | 3.187 | 5.83 | 4.203 | 64.5 | 15.2 |
| Comp. Example 2 | DOWEX ™ G-26(H) | 2.395 | 4.588 | 3.654 | 61.4 | 12.7 |
| Comp. Example 3 | Amberlite ™ IRC-7481 | 2.903 | 5.45 | 4.152 | 61.6 | 16.2 |
| Example 4 | Purolite ® S957 | 2.507 | 5.58 | 4.312 | 31.62 | 11.13 |

Examples 5-9: Preparation of a Composite Extractant-Enhanced Polymer Resin

A. Preparation of a Mixture Solution of Ethanol and DEHPA 125 mL of analytical grade ethanol and 125 mL DEHPA were measured into a 400-mL beaker having a magnetic bar stirrer, followed by 30 minutes of agitation with the magnetic stirrer. A similar procedure was followed to prepare the mixture solution of DEHPA and ethanol for the experiments in Part B, as needed, without further repeated descriptions.

B. Preparation of a Composite Extractant-Enhanced Polymer Resin

Examples 5 and 6 detail the preparation of a composite extractant-enhanced polymer resin. DEHPA is used as the extractant, and Dow Chemical's Amberlite™ XAD7HP and XAD1180N are used as the polymer resins. These resins have no specific functional groups. 50 grams of Amberlite™ XAD7HP polymer resin was weighed into a 150-mL beaker. About 75 mL of the mixture solution of DEHPA and ethanol was added to the beaker. The polymer resin was soaked in the mixture solution for about 3 hours to produce the composite. The composite was filtered from the mixture solution by gravity and washed with 30 mL of ethanol. The obtained composite is designated as Amberlite™ XAD7HP-DEHPA-Wet. About one half of the wet composite was oven-dried at about 110° C. for at least two hours. The obtained sample is designated as Amberlite™ XAD7HP-DEHPA-Dry. The same procedure was repeated to prepare Amberlite™ XAD1180N-DEHPA-Wet and Amberlite™ XAD1180N-DEHPA-Dry.

Examples 7 to 9 detail the preparation of other composite extractant-enhanced functional ion-exchange resins. DEHPA was used as the extractant while Dowex™ G-26(H), Amberlite™ IRC-7841, and Purolite® S957 were used as the functional ion-exchange resin. The procedure described above for examples 5 and 6 was used to prepare Dowex™ G-26(H)-DEHPA-Wet, Dowex™ G-26(H)-DEHPA-Dry, Amberlite™ IRC-7461-DEHPA-Wet, Amberlite™ IRC-7461-DEHPA-Dry, Purolite® S957-DEHPA-Wet, and Purolite® S957-DEHPA-Dry. The DEHPA loadings for these five composite extractant-enhanced polymer resins were analyzed by x-ray fluorescence (XRF) and are listed in Table 2.

TABLE 2

DEHPA Loadings of Composites of DEHPA-Enhanced Polymer Resins

| Examples | Sample Name | DEHPA % Dry | DEHPA % Wet |
|---|---|---|---|
| Example 5 | XAD7HP-DEHPA | 22.41 | 8.904 |
| Example 6 | XAD1180N-DEHPA | 29.17 | 7.207 |
| Example 7 | Dowex ™ G-26(H)-DEHPA | 8.873 | 8.203 |
| Example 8 | Amberlite ™ IRC-7481-DEHPA | 6.641 | 6.192 |
| Example 9 | Purolite ® S957-DEHPA | 20.22 | 13.44 |

Examples 10-17: Direct Extraction of Scandium from an Aqueous Acid-Leaching Slurry Containing a High Concentration of Non-Reduced Ferric Ions Using a Composite Extractant-Enhanced Polymer Resin 1 gram of the composite extractant-enhanced polymer resin, Dowex™ G-26(H)-DEHPA-Wet, containing sulfonic acid functional groups and DEHPA, was weighed into a 150-mL beaker having a magnetic bar stirrer. 25 mL of feedstock acid-leaching slurry from Comparative Example 1 was added to the beaker. The composite and slurry mixture was agitated with the magnetic stirrer for about one hour. The composite and slurry mixture was then filtered to produce a raffinate filtrate. The filtrate was then analyzed with ICP-OES, and the results are tabulated in Table 3, Example 10. In Tables 3-6, all of the monovalent cations and divalent cations are not listed because these monovalent and divalent ions are not competing for extraction with the rare earth metal ions which are mainly trivalent. Also, some minor elements (very low concentrations) are not listed in these tables. The concentration of scandium was reduced from 95.9 ppm in the feedstock slurry to 70.4 ppm in the raffinate filtrate, for a recovery of about 26.6%, which was enhanced from 5.6% in Comparative Example 2 where only Dowex™ G-26(H) resin was used. In Example 11, Dowex™ G-26(H)-DEHPA-Dry was used, and the scandium concentration was reduced from 95.9 ppm to 86.9 ppm, for a recovery of 9.4% which is enhanced from 5.6% in Comparative Example 2 where only Dowex™ G-26(H) resin was used. However, the recovery of scandium by the composite extractant-enhanced Dowex™ G-26(H) was still somewhat low, mainly because of the excess of trivalent cations, like ferric ions ($Fe^{3+}$) and tetravalent cations like $Ti^{4+}$ ions, ($[Fe^{3+}]+[Ti^{4+}])/[Sc^{3+}]>75.3$, present in the feedstock slurry.

Examples 12 and 13 show that composite extractant-enhanced porous resins, Amberlite™ XAD7HP-DEHPA-Dry and XAD1180N-DEHPA-Dry, reduced the scandium concentration from 92.1 ppm to 63.3 ppm and 60.1 ppm, respectively, which translates into recoveries of 31.3% and 34.7%, respectively. The resins of Amberlite™ XAD7HP and Amberlite™ XAD1180N without the addition of an extractant show no propensity for uptaking scandium ions. Therefore, these composite extractant-enhanced porous resins have enhanced capability in the uptake of scandium ions from an acid-leaching slurry having a ratio of ($[Fe^{3+}]+[Ti^{4+}]$) to $[Sc^{3+}]$ greater than 231:1.

The composite extractant-enhanced polymer resin, Amberlite™ IRC-7481-DEHPA-Dry, reduced the scandium concentration from 92.1 ppm to 38.5 ppm (Example 14), a 58.2% scandium recovery with a ratio of ($[Fe^{3+}]+[Ti^{4+}]$) to $[Sc^{3+}]$ greater than 231:1 in the feedstock slurry, which is enhanced from a 2.9% scandium recovery in Comparative Example 3 where only Amberlite™ IRC-7481 was used. When the amount of this composite was doubled to 2 grams, as shown in Example 16, the scandium concentration was further reduced from 87.4 ppm to 15.9 ppm, a scandium recovery of 81.8% with a ratio of ($[Fe^{3+}]+[Ti^{4+}]$) to $[Sc^{3+}]$ greater than 234:1 in the feedstock slurry.

The composite extractant-enhanced polymer resin, Purolite® S957-DEHPA-Dry reduced the scandium concentration from 92.1 ppm to 15.07 ppm (Example 15), a 83.6% scandium recovery with a ratio of ($[Fe^{3+}]+[Ti^{4+}]$) to $[Sc^{3+}]$ greater than 231:1 in the feedstock slurry, which is enhanced from the 60.3% scandium recovery in Example 4 where only Purolite S957 resin was used. When the amount of this composite was doubled to 2 grams, as shown in Example 17, the scandium concentration was further reduced from 87.4 ppm to 0.69 ppm, a scandium recovery of 99.2% with a ratio of ($[Fe^{3+}]+[Ti^{4+}]$) to $[Sc^{3+}]$ greater than 234:1 in the slurry.

In summary, Examples 10 to 17 demonstrate that a composite extractant-enhanced polymer resin enhances the capability in uptake of scandium ions from an acid-leaching slurry that contains a large amount of excess trivalent ions such as ferric ions and tetravalent ions such as titanium ions.

TABLE 3

Elemental Analysis for Direct Extraction of Scandium from Non-Reduced Acid-Leaching Slurry by a Composite Extractant-Enhanced Polymer Resin

| Example | Comp. | Form | Slurry:Resin | Sc | Ti | Fe | La | Ce | Nd | Sm | Gd | Yb |
|---|---|---|---|---|---|---|---|---|---|---|---|---|
| | Feed | | | 95.9 | 916 | >7944 | 2.948 | 92.3 | 7.21 | 3.187 | 5.83 | 4.203 |
| Ex. 10 | DOWEX ™ G-26(H)-DEHPA | Wet | 25:1 | 70.4 | 885 | >7510 | 1.972 | 64.7 | 6.39 | 2.103 | 4.751 | 3.629 |
| Ex. 11 | DOWEX ™ G-26(H)-DEHPA | Dry | 25:1 | 86.9 | 902 | >7553 | 2.034 | 61.1 | 5.71 | 2.326 | 4.485 | 3.569 |
| | Feed | | | 92.1 | >1995 | >24092 | 1.813 | 95.2 | 6.06 | 2.584 | 8.27 | 3.255 |
| Ex. 12 | Amberlite ™ XAD7HP-DEHPA | Dry | 25:1 | 63.3 | >1923 | >23176 | 1.775 | 94.4 | 5.81 | 1.872 | 8.26 | 3.069 |
| Ex. 13 | Amberlite ™ XAD1180N-DEHPA | Dry | 25:1 | 60.1 | >1855 | >22236 | 1.637 | 89.7 | 5.72 | 2.425 | 7.61 | 3.018 |
| Ex. 14 | Amberlite ™ IRC-7481-DEHPA | Dry | 25:1 | 38.55 | >1760 | >21689 | 1.51 | 86.3 | 5.63 | 2.253 | 7.37 | 2.795 |

TABLE 3-continued

Elemental Analysis for Direct Extraction of Scandium from Non-Reduced
Acid-Leaching Slurry by a Composite Extractant-Enhanced Polymer Resin

| Example | Comp. | Form | Slurry:Resin | Sc | Ti | Fe | La | Ce | Nd | Sm | Gd | Yb |
|---|---|---|---|---|---|---|---|---|---|---|---|---|
| Ex. 15 | Purolite® S957-DEHPA | Dry | 25:1 | 15.07 | 597 | >18102 | 1.44 | 88.3 | 5.44 | <1.682 | 6.44 | 2.964 |
| | Feed | | | 87.4 | >1940 | >23117 | 1.666 | 86.9 | 6.33 | <1.766 | 8.12 | 3.009 |
| Ex. 16 | Amberlite™ IRC-7481-DEHPA | Dry | 25:2 | 15.9 | >1901 | >24200 | 1.731 | 96.4 | 6.51 | <1.766 | 8.58 | 3.139 |
| Ex. 17 | Purolite® S957-DEHPA | Dry | 25:2 | 0.69 | 252.1 | >16328 | 1.61 | 93.4 | 6.18 | <1.766 | 6.48 | 3.192 |

Examples 18-25: Direct Extraction of Scandium from an Aqueous Acid-Leaching Solution Containing Non-Reduced Ferric Ions with a Composite Extractant-Enhanced Polymer Resin When the ratio of ($[Fe^{3+}]+[Ti^{4+}]$) to $[Sc^{3+}]$ was reduced to a level of about 8.2:1 in the acid-leaching solution, as is the case with the feedstock used for Examples 18 to 20 (Table 4), Purolite® S957 resin containing phosphoric acid functional groups reduced the scandium ion concentration from 124.9 ppm to less than 0.0074 ppm, an approximately 100% scandium recovery (Example 19). However, Dowex™ G-26 (H), which is a strong cation exchange resin containing sulfonic acid functional groups, only reduced the scandium concentration from 124.9 ppm down to 46.91 ppm, a 62.4% scandium ion recovery (Example 18). Amberlite™ IRC-7481 containing iminodiacetic acid functional groups reduced the scandium concentration from 124.9 ppm to 28.23 ppm, a 77.4% scandium recovery (Example 20), which is consistent with the teaching from the disclosure of U.S. Pat. No. 4,816,233. An extractant immobilized on a polymer matrix like Purolite® S957 that has phosphoric acid functional groups (similar to DEHPA's functional group) extracts valuable metals such as scandium from an acid-leaching solution/slurry selectively, as DEHPA does in the solvent extraction process. Purolite® S957 extraction overcomes the shortcomings of solvent extraction, such as solvent loss, difficulties in achieving a complete organic-aqueous phase separation, emulsion formation, and crud formation.

The feedstock for Examples 21-25 also had a ratio of ($[Fe^{3+}]+[Ti^{4+}]$) to $[Sc^{3+}]$ of 8.2:1. Example 21 shows that the composite extractant-enhanced polymer resin, Dowex™ G-26(H)-DEHPA, reduces scandium ion concentration from 125.4 ppm to 15.89 ppm, an 87.3% scandium recovery (Example 22), which is enhanced from the 62.4% recovery in Example 18 where only a Dowex™ G-26(H) resin was used. The composite extractant-enhanced polymer resin, Amberlite™ IRC-7481-DEHPA, shows a complete uptake of scandium from 125.4 ppm to <0.0037 ppm (Example 23), which is enhanced from a recovery of 77.4% in Example 20 where only Amberlite™ IRC-7481 was used. The composite extractant-enhanced polymer resin, Purolite® S957-DEHPA, has a complete uptake of scandium ions from an acid-leaching solution that has a ratio of ($[Fe^{3+}]+[Ti^{4+}]$) to $[Sc^{3+}]$ of 8.2:1, since Purolite® S957 uptakes 100% scandium by itself (Example 19).

The composite extractant-enhanced polymer resins, Amberlite™ XAD1180N-DEHPA and Amberlite™ XAD7HP-DEPHA, as shown in Examples 24 and 25, reduced the scandium from 125.4 ppm to 40.18 ppm and 1.46 ppm, respectively, for a recovery of 68.0% and 98.8%, respectively, while Amberlite™ XAD1180N and Amberlite™ XAD7HP used alone have no activity for uptaking scandium ions from acid-leaching slurries.

Examples 18 to 25 further show that a composite extractant-enhanced polymer resin, in this case, DEHPA-enhanced polymer resin, is capable of a direct extraction of valuable metals such as scandium ions from an acid-leaching solution or slurry and, at the same time, overcomes the shortcomings of solvent extractions in solvent loss, difficulties in achieving a complete solvent-aqueous phase separation, emulsions, crud formation, etc.

TABLE 4

Direct Extraction of Scandium from an Aqueous Acid-Leaching Solution
having a Relatively High Concentration of Non-Reduced Ferric Ions

| Example | | | Sc | Ti | Fe | Y | La | Ce | Nd | Sm | Gd | Yb |
|---|---|---|---|---|---|---|---|---|---|---|---|---|
| | Feed | | 124.9 | 8.99 | 1269 | 44.76 | 3.172 | 8.1 | 7.53 | 1.847 | 4.261 | 5.54 |
| Ex. 18 | DOWEX™ G-26(H) | as is | 46.91 | 7.34 | 677 | 7.09 | 0.2468 | 2.789 | 1.965 | <1.766 | 0.765 | 1.817 |
| Ex. 19 | Purolite® S957 | as is | <0.0074 | <0.09999 | 29.93 | 18.11 | 1.291 | 4.659 | 3.732 | <1.766 | 1.279 | 2.913 |
| Ex. 20 | Amberlite™ IRC-7481 | as is | 28.23 | <0.0999 | 51.9 | 38.72 | 2.403 | 6.44 | 6.18 | 1.992 | 2.952 | 4.933 |
| | Feed | | 125.4 | 9.11 | >1262 | 47.5 | 3.401 | 7.35 | 7.08 | 2.273 | 4.441 | 5.4 |
| Ex. 21 | DOWEX™ G-26(H)-DEHPA | Dry | 15.89 | 5.61 | 237.3 | 1.308 | <0.0091 | <0.859 | 0.948 | <0.883 | 0.0619 | 0.692 |
| Ex. 22 | Purolite® S957-DEHPA | Dry | <0.0037 | <0.0037 | 9.52 | <0.0038 | 0.0409 | <0.859 | 0.851 | <0.883 | 0.0619 | 0.567 |

TABLE 4-continued

Direct Extraction of Scandium from an Aqueous Acid-Leaching Solution
having a Relatively High Concentration of Non-Reduced Ferric Ions

| Example | | | Sc | Ti | Fe | Y | La | Ce | Nd | Sm | Gd | Yb |
|---|---|---|---|---|---|---|---|---|---|---|---|---|
| Ex. 23 | Amberlite ™ IRC-7481-DEHPA | Dry | <0.0037 | <0.0499 | 9.8 | 6.16 | 0.576 | 1.233 | 1.412 | <0.883 | 0.4947 | 0.888 |
| | | Feed | 125.4 | 9.11 | >1262 | 47.5 | 3.401 | 7.35 | 7.08 | 2.273 | 4.441 | 5.4 |
| Ex. 24 | XAD1180N-DEHPA | Dry | 40.18 | 7.24 | >1026 | 38.61 | 2.757 | 5.76 | 5.92 | 2.129 | 3.508 | 4.499 |
| Ex. 25 | XAD7HP-DEHPA | Dry | 1.46 | 2.412 | 519 | 20.06 | 2.273 | 4.901 | 4.555 | 1.14 | 2.005 | 2.516 |

Examples 26-29: Direct Extraction of Scandium from an Aqueous Acid-Leaching Solution in which Ferric Ions Were Reduced into Ferrous Ions with a Composite Extractant-Enhanced Polymer Resin As shown in Table 5, ferric ions in the acid-leaching solution were reduced to ferrous ions for Examples 26 to 29. Amberlite™ XAD1180N and Amberlite™ XAD7HP resins used alone do not show any activity in uptaking scandium ion from the acid-leaching solution in which the ferric ions were reduced to ferrous ions, as shown in Examples 26 and 27, respectively. The composite extractant-enhanced polymer resins, Amberlite™ XAD1180N-DEHPA or Amberlite™ XAD7HP-DEHPA, demonstrate a complete uptake of scandium ions from the slurry in which ferric ions were reduced to ferrous ions, as shown in Examples 28 and 29, respectively. Examples 26 to 29 further illustrate that a composite extractant-enhanced polymer resin uptakes scandium ions and overcomes the shortcomings of solvent extraction in solvent loss, difficulties in achieving a complete solvent and aqueous separation, emulsions, crud formation, etc.

TABLE 5

Direct Extraction of Scandium from an Aqueous Acid-Leaching Solution
having a High Concentration of Iron Ions as Ferrous Ions

| Example | | | Sc | Ti | Fe | Y | La | Ce | Nd | Sm | Gd | Yb |
|---|---|---|---|---|---|---|---|---|---|---|---|---|
| | | Feed | 99.4 | 2.166 | 733 | 54.6 | 4.064 | 7.59 | 1057 | 2.403 | 4.51 | 6.25 |
| Ex. 26 | Amberlite ™ XAD1180N | as is | 93.2 | <0.0999 | 620 | 43.58 | 3.299 | 6.28 | 879 | <1.766 | 3.496 | 5.17 |
| Ex. 27 | Amberlite ™ XAD7HP | as is | 96.8 | <0.0999 | 638 | 45.68 | 3.462 | 7.22 | 885 | <1.766 | 3.710 | 5.33 |
| | | Feed | 99.4 | 2.166 | 733 | 54.6 | 4.064 | 7.59 | 1057 | 2.403 | 4.51 | 6.25 |
| Ex. 28 | Amberlite ™ XAD1180N-DEHPA | Dry | <0.0074 | <0.0999 | 609 | 34.15 | 2.89 | 4.85 | 756 | <1.766 | 2.729 | 4.236 |
| | | Feed | 118.6 | 1.432 | 1144 | 45.12 | 3.113 | 7.13 | 7.72 | <1.766 | 4.074 | 5.72 |
| Ex. 29 | Amberlite ™ XAD7HP-DEHPA | Dry | <0.0074 | <0.0999 | 2.677 | 2.618 | 2.769 | 6.29 | 6.3 | <1.766 | 1.372 | 1.176 |

Example 30: Direct Extraction of Scandium from an Aqueous Acid-Leaching Solution Containing a High Concentration of Non-Reduced Ferric Ions with a Cation Ion-Exchange Resin with Phosphoric Acid Functional Groups (a Column Process)

7.8 g of Purolite® S957 resin (10 mL) was added into an analytical glass buret used as a column. The bottom of the analytical glass buret was connected to a Masterflex® Tubing (S/L 14). The resin bed of Purolite S957® was filled with DI water, and the air bubbles were removed from the resin bed. An acid-leaching solution was carefully added into the analytical glass buret (column). The composition of the acid-leaching solution is listed in Table 6, and its ratio of ($[Fe^{3+}]+[Ti^{4+}]$) to $[Sc^{3+}]$ is about 75:1. The acid-leaching solution was pumped through the resin bed at a flow rate of 0.75 mL/min (4.5 bed volumes per hour) and the raffinate effluent samples were collected at 30 minute intervals. Analysis of the raffinate effluents and the extraction results are tabulated in Table 6 and shown in FIG. 1. In the first 30 minutes, 98% of scandium ions were taken up by the Purolite S957 resin, with a loading of about 368 ppm Sc on the Purolite® S957 resin. At the same time, about 91% ferric ions were also taken up by the resin, which results in a 353:1 ratio of [Fe]/[Sc] in the effluent. However, after 30 minutes, as more ferric ions were loaded on to the Purolite® S957 resin's cation exchange sites, the scandium extraction efficiency decreased substantially to 85%, 60%, and 42% at 60, 90, and 120 minutes, respectively. The ratio of [Fe]/[Sc] in the effluent decreased to 102:1, 45:1, and 31:1, accordingly, while a corresponding scandium loading on the resin increased to 1007, 1684, and 2313 ppm.

This example demonstrates that Purolite S957 that has phosphoric acid functional groups can extract about 98% scandium from an acid-leaching slurry that contains at least 13,339 ppm ferric ions with a scandium loading of about 368 ppm.

TABLE 6

Elemental Analysis for the Raffinate at Different Times on Stream When Using Purolite S957 to Extract Rare Earth Metals from an Acid-Leaching Solution that Contains a Large Amount of Ferric Ions

| Time, min | Sc | Ti | Fe | Y | La | Ce | Nd | Sm | Gd | Yb |
|---|---|---|---|---|---|---|---|---|---|---|
| Feed | 166.5 | >1865 | >13399 | 29.69 | 3.022 | 69.1 | 7.46 | 3.27 | 6.84 | 5.09 |
| 30 | 2.9 | >22.09 | >1270 | 8.8 | 0.861 | >.2147 | 1.88 | 0.797 | 1.352 | 1.279 |
| 60 | 24.61 | >127.5 | >3125 | >19.46 | 1.975 | >49.40 | 4.543 | 1.99 | 3.543 | 2.81 |
| 90 | 66.1 | >276.2 | >3701 | >19.39 | 1.977 | >47.56 | 4.638 | 2.089 | 4.026 | 2.708 |
| 120 | 96.6 | >424.8 | >3756 | >17.45 | 1.846 | >43.60 | 4.295 | 1.938 | 3.871 | 2.478 |

Example 31: Direct Extraction of Scandium from an Aqueous Acid-Leaching Solution Containing a High Concentration of Non-Reduced Ferric Ions with a Composite Extractant-Enhanced Polymer Resin with Phosphoric Acid Functional Groups 10 grams of the composite extractant-enhanced polymer resin, Purolite S957-DEHPA-Dry, was added into an analytical glass buret. After contacting water, the volume of the analytical glass buret (resin bed) was about 23 mL. The bottom of the analytical glass buret was connected to a Masterflex® Tubing (L/S 14). The resin bed was filled with DI water, and the air bubbles were removed from the resin bed. An acid-leaching solution was added into the analytical glass buret. The composition of acid-leaching solution is listed in Table 7, and its ratio of ([$Fe^{3+}$]+[$Ti^{4+}$]) to [$Sc^{3+}$] is about 83:1. The acid-leaching solution was pumped through the resin bed at a flow rate of 0.75 mL/min (~2 bed volumes per hour). Raffinate effluent samples were collected at 30 minute intervals. Analysis of the raffinate effluents and the extraction results are tabulated in Table 7 and illustrated in FIG. 1. In the first 150 minutes, 98% or more of the scandium ions were taken up by the Purolite® S957-DEHPA, with a loading of as high as 2249 ppm Sc on the Purolite® S957-DEHPA, which is 6.4 times more efficient than Purolite® S957 resin used alone. During this period of time, the percentage of ferric ions that were loaded onto the resin decreased from 100% (30 min), to 93% (60 min), to 67% (90 min), to 39% (120 min), and to 26% (150 min). More importantly, the ratio of [Fe]/[Sc] in the effluent was extremely high, about 30,000 or higher for the first 90 minutes and decreased to about 3000 at 120 and 150 minutes. The loading of an extractant, DEHPA, onto the Purolite® S957 resin enhanced the capability of the Purolite® S957 resin to achieve selective and complete uptake of scandium ions from the acid-leaching slurry containing a high concentration of ferric ions. This is particularly useful for extracting a low concentration of scandium from an acid-leaching slurry or solution that contains a high concentration of trivalent cations such as ferric ions and tetravalent cations like titanium.

Furthermore, after 150 minutes, the concentration of ferric ions was basically the same as that of the feedstock solution, suggesting that there was no further uptake of ferric ions. However, the composite, Purolite® S957-DEHPA, continued to uptake scandium ions with an extraction efficiency of 90% (180 min), 78% (210 min), and 67% (240 min), and a ratio of [Fe]/[Sc] in the effluent of 787 (180 min), 346 (210 min), and 230 (240 min). These results suggest that the composite extractant-enhanced polymer resin (Purolite® S957-DEHPA) has the ability of exchanging out ferric ions for scandium ions with a very high selectivity. After 240 minutes on stream, about 4714 ppm scandium was loaded onto the composite Purolite® S957-DEHPA.

This example demonstrates that composite extractant-enhanced polymer resins are highly suitable for economical extraction of rare earth metal ions from a stream of acid-leaching slurry or solution, even if the stream of aqueous slurry or solution contains large amounts of ferric ions, without reducing the ferric ions to ferrous ions. At the same time, the composite extractant-enhanced polymer resin allows enhanced extraction of rare earth metals from a stream of acid-leaching slurry or solution and overcomes the shortcomings of solvent extraction in solvent loss, difficulties of achieving a complete organic-aqueous phase separation, formation of emulsions, and crud formation.

TABLE 7

Elemental Analysis for the Raffinate at Different Times on Stream When Using Purolite ® S957-DEHPA to Extract Rare Earth Metals from an Acid-Leaching Solution that Contains a Large Amount of Ferric Ions

| Time on Stream, min | Sc | Ti | Fe | Y | La | Ce | Nd | Sm | Gd | Yb |
|---|---|---|---|---|---|---|---|---|---|---|
| Head | 154.7 | >1692 | 13946 | 27.75 | 2.761 | 62.2 | 6.41 | 3.011 | 6.25 | 4.246 |
| 30 | 0.0018 | 0.1199 | 66.4 | 0.661 | 0.0746 | 1.610 | 0.1317 | 0.0456 | 0.074 | 0.0689 |
| 60 | <0.0004 | 0.552 | 946 | 7.47 | 0.775 | >18.41 | 1.563 | 0.642 | 0.948 | 0.865 |
| 90 | <0.0004 | 5.09 | 4604 | >18.79 | 1.842 | >45.76 | 4.068 | 1.765 | 2.835 | 2.475 |
| 120 | 2.389 | >29.89 | 8528 | >20.87 | 2.014 | >50.2 | 4.757 | 2.073 | 3.758 | 2.914 |
| 150 | 2.436 | >43.65 | 10283 | >22.33 | 2.143 | >53.3 | 5.15 | 2.314 | 4.119 | 3.177 |
| 180 | 14.77 | >152.2 | 14435 | >17.76 | 1.769 | >42.57 | 4.236 | 1.836 | 3.866 | 2.543 |
| 210 | 33.84 | >215.1 | 14562 | >17.44 | 1.736 | >41.06 | 4.172 | 1.816 | 3.820 | 2.474 |
| 240 | 50.4 | >303.9 | 14402 | >17.59 | 1.745 | >41.07 | 4.113 | 1.826 | 3.831 | 2.445 |

Example 32: Direct Extraction of Scandium from a Synthetic Solution Containing about 3,000 ppm Iron Ions with a Composite Extractant-Enhanced Polymer Resin with Phosphoric Acid Functional Groups (Regenerated with Multi-Pass of Acids, Less Cost Effective)

A synthetic stream containing 24.9 ppm scandium along with 4,302 ppm nickel, 246 ppm cobalt, 2,988 ppm iron, 2,598 ppm aluminum, 207 ppm chromium, and other divalent cations, such as calcium (>20,000 ppm), copper, magnesium (>11,000 ppm), manganese, zinc, silicon, etc. was passed through a PVC column filled with about 4.25 liters of a composite extractant-enhanced polymer resin, Purolite® S957-DEHPA.

The composite extractant-enhanced polymer resin (Purolite® S957-DEHPA) was used in the previous runs in which it was loaded with scandium ions along with other undesirable cations. The scandium ions were stripped from the loaded resin using a sodium carbonate solution (about 16 liters) heated to about 80° C. for about one hour under mixing conditions. The carbonate solution that was used as a stripping solution contained about 200 grams of sodium carbonate per liter. The stripping procedure was repeated a second time.

The Sc-stripped resin was then regenerated using 10 liters sulfuric acid solution (440 grams per liter) that contained about 5% hydrogen peroxide for one hour under mixing conditions. The resin was then regenerated using a 10 liter hydrochloric acid solution (200 grams per liter) under mixing conditions for another hour. The resin was then loaded onto a PVC column and a stream of 10 liters of sulfuric acid solution (440 grams per liter) and a stream of 10 liters of hydrochloric acid (200 grams per liter) were passed through the column consecutively. After rinsing with water, the column was then used for the run described below.

About 100 liters of the synthetic solution was pumped to the top of the column for about 15 hours. At the beginning, the flow rate was relatively high and, towards the end, the flow rate was relatively low, possibly due to different pump suction forces corresponding to different liquid levels of the feed solution which was contained in a 55 gallon drum. The exhausted solution from the column, raffinate, was sampled every hour for assays. The collected raffinate solution was then added to additional scandium solution to form more feedstock solution containing scandium between 15 and 27 ppm; and this was repeated 7 times.

The results for recovering scandium from the synthetic solution are shown in FIG. 2. Scandium ions in the feedstock are partially retained by the extractant-enhanced polymer resin, Purolite® S957-DEHPA; scandium ions in the raffinate increased with the time on stream. The initial scandium recovery was almost 100%; then the scandium recovery slowly decreased while the resin continued to be loaded with scandium ions. The resin continued to load scandium even though there were very large amounts of other trivalent cations such as iron ions (~100:1 for Fe:Sc in mass). After about 150 hours on stream, the scandium concentration in the raffinate increased to a level greater than 15 ppm; the cumulated scandium recovery at the end of the run was about 77%.

The loaded resin was then stripped with a first sodium carbonate solution using the same procedures described above. The first stripping solution contained 1,013 ppm Sc, 2.3 ppm Al, 291 ppm Ca, 1.7 ppm Co, 0.9 ppm Cr, 2.6 ppm Cu, 45 ppm Fe, 106 ppm Mg, 1.6 ppm Mn, <0.2 ppm Ni, 164 ppm Si, and 1.8 ppm Zn. Scandium and other impurities in the stripping solution were then precipitated with hydrochloric acid, followed by filtration, to produce a filtered cake. The resin was then stripped with a second sodium carbonate solution and the stripping solution contained a lower concentration of scandium; the second stripping solution may be used as a first stripping solution in the next cycle.

The resin was then subjected to the same regeneration procedures that are described in this example. The regenerated resin was then ready for the next cycle in the following example.

Example 33: Direct Extraction of Scandium from a Synthetic Solution Containing about 16,000 ppm Iron Ions with a Composite Extractant-Enhanced Polymer Resin with Phosphoric Acid Functional Groups (Regenerated with Multi-Pass of Acids, Less Cost Effective), and Followed by Stripping and Low Cost Ex-Situ Regeneration with One Pass of Hydrochloric Acid A synthetic stream containing about 9 ppm scandium along with 56 ppm nickel, 8.0 ppm cobalt, 16,145 ppm iron, 1,247 ppm aluminum, 202 ppm chromium, and other divalent cations, such as calcium (1,005 ppm), copper (1.0 ppm), magnesium (18,654 ppm), manganese (1,761 ppm), zinc (4.7 ppm), silicon (234 ppm), etc. was passed through a PVC column filled with about 4 liters of a composite extractant-enhanced polymer resin (Purolite® S957-DEHPA) that was regenerated in the previous example.

About 100 liters of the synthetic solution was pumped to the top of the column for about 10 hours. The raffinate solution was sampled every hour for assays. The collected raffinate solution was then added to additional scandium solution to form more feedstock solution that contained scandium in a concentration between 8 and 10 ppm; and this was repeated 13 times.

The results for recovering scandium from the synthetic solution are shown in FIG. 3. Scandium ions in the feedstock were partially retained by the extractant-enhanced polymer resin, Purolite® S957-DEHPA; scandium ions in the raffinate increased with the time on stream. The initial scandium recovery was almost 100%; then scandium recovery slowly decreased while the resin continued to be loaded with scandium ions. The resin continued to load scandium even though there were very large amounts of other cations such as iron ions (>1,600:1 for Fe:Sc in mass) in the solution. After about 150 hours on stream, the scandium concentration in the raffinate increased to a level greater than 6 ppm; the cumulated scandium recovery at the end of the run was about 81%.

The loaded resin was removed from the column and was stripped at 80° C. with a first sodium carbonate solution (10.5 liters, 200 grams sodium carbonate per liter) under mixing conditions for one hour. The first stripping solution contained 905 ppm Sc, 29 ppm Al, 295 ppm Ca, <0.7 ppm Co, <0.2 ppm Cr, <0.1 ppm Cu, 78 ppm Fe, 218 ppm Mg, 3.2 ppm Mn, <0.7 ppm Ni, 258 ppm Si, and <0.5 ppm Zn. Scandium and other impurities in the stripping solution were then precipitated with hydrochloric acid, followed by filtration, to produce a filtered cake.

The loaded resin was then stripped at 80° C. with a second sodium carbonate solution (10 liters, 200 grams sodium carbonate per liter) under mixing conditions for one hour. The second stripping solution contained 326 ppm Sc, 7 ppm Al, 114 ppm Ca, <0.1 ppm Co, <0.1 ppm Cr, <0.04 ppm Cu, 20 ppm Fe, 88 ppm Mg, 0.6 ppm Mn, <0.3 ppm Ni, 79 ppm Si, and <0.2 ppm Zn. The second stripping solution may be used as the first stripping solution in the next cycle.

The resin was then regenerated by flowing a hydrochloric acid solution (200 grams per liter, 9 liters) through the column. The used hydrochloric acid solution contained 0.1 ppm Sc, 228 ppm Al, 179 ppm Ca, 0.4 ppm Co, 35 ppm Cr, 0.5 ppm Cu, 3,222 ppm Fe, 752 ppm Mg, 101 ppm Mn, <0.7 ppm Ni, 84 ppm Si, and 5.6 ppm Zn. The regenerated resin was ready for the next cycle.

Example 34: Direct Extraction of Scandium from a Synthetic Solution Containing about 15,000 ppm Iron Ions with a Composite Extractant-Enhanced Polymer Resin with Phosphoric Acid Functional Groups (Regenerated Ex-Situ with a Single-Pass of Acids, Very Economic), and Followed by In-Situ Stripping and In-Situ Regeneration with One Pass of Hydrochloric Acid A synthetic stream containing about 9 ppm scandium along with 36 ppm nickel, 8 ppm cobalt, 15,210 ppm iron, 1,272 ppm aluminum, 122 ppm chromium, and other divalent cations, such as calcium (>372 ppm), copper (0.8 ppm), magnesium (23,048 ppm), manganese (>1,055 ppm), zinc (23 ppm), silicon (33 ppm), etc. was passed through a PVC column filled with about 4 liters of a composite extractant-enhanced polymer resin (Purolite® S957-DEHPA) that was regenerated in the previous example.

About 100 liters of the synthetic solution was pumped to the top of the column for about 10-12 hours. The raffinate solution was sampled every hour for assays. The collected raffinate solution was then added to additional scandium solution to form more feedstock solution that contained scandium in a concentration between 8 and 11 ppm; and this was repeated 12 times.

The results for recovering scandium from the synthetic solution are shown in FIG. 4. Scandium ions in the feedstock were partially retained by the extractant-enhanced polymer resin, Purolite® S957-DEHPA; scandium ions in the raffinate increased with the time on stream. The initial scandium recovery was almost 100%; then scandium recovery slowly decreased while the resin continued to be loaded with scandium ions. The resin continued to load scandium even though there were very large amounts of other cations such as iron ions (~1,500:1 for Fe:Sc in mass). After about 150 hour on stream, scandium concentration in the raffinate increased to a level greater than 7 ppm; the cumulated scandium recovery at the end of the run was about 82%.

The loaded resin was then stripped in-situ at 60° C. with a first sodium carbonate solution (which was the second stripping solution from Example 33, about 8.5 liters) by flowing through the column. Such first stripping solution contained 1,277 ppm Sc, 9.4 ppm Al, 88 ppm Ca, <0.3 ppm Co, <0.2 ppm Cr, 1.0 ppm Cu, 63 ppm Fe, 41 ppm Mg, <0.1 ppm Mn, 4.1 ppm Ni, 140 ppm Si, and 10 ppm Zn. Scandium and other impurities in the stripping solution were then precipitated with hydrochloric acid, followed by filtration, to produce a filtered cake.

The resin was then stripped in-situ with a second sodium carbonate solution (fresh solution, 200 gram sodium carbonate per liter, 10 liters) at 60° C. by flowing through the column. The second stripping solution contained 326 ppm Sc, 31 ppm Al, 116 ppm Ca, <0.3 ppm Co, <0.2 ppm Cr, <0.1 ppm Cu, 42 ppm Fe, 57 ppm Mg, <0.1 ppm Mn, <0.7 ppm Ni, 180 ppm Si, and <0.5 ppm Zn; the second stripping solution may be used as a first stripping solution in the next cycle.

The resin was then regenerated in-situ by flowing a hydrochloric acid solution (200 grams per liter, 10 liters) through the column. The used hydrochloric acid solution contained 0.1 ppm Sc, 111 ppm Al, 44 ppm Ca, <0.03 ppm Co, <18.5 ppm Cr, <0.008 ppm Cu, >5,552 ppm Fe, >190 ppm Mg, 38 ppm Mn, 0.7 ppm Ni, 22 ppm Si, and 0.9 ppm Zn. The regenerated resin was ready for the next cycle.

While specific embodiments of the invention have been described in detail, it will be appreciated by those having ordinary skill in the art that various modifications and alternatives to those details could be developed in light of the overall teachings of the disclosure. The presently preferred embodiments described herein are meant to be illustrative only and not limiting as to the scope of the invention, which is to be given the full breadth of the appended claims and any and all equivalents thereof.

CLAUSES

Clause 1: A composite comprising an extractant and a polymer resin.

Clause 2: The composite of clause 1, wherein the extractant is one of cationic, non-ionic, and anionic or a combination thereof.

Clause 3: The composite of clause 1 or clause 2, wherein the polymer resin comprises one of a non-functional polymer or a functional polymer.

Clause 4: The composite of any of clauses 1-3, wherein the extractant comprises a cation extractant having at least one functional group selected from organophosphorus acids, carboxylic acids, and sulfonic acids.

Clause 5: The composite of any of clauses 1-4, wherein the extractant comprises an anionic extractant having at least one amine functional group.

Clause 6: The composite of any of clauses 1-5, wherein the extractant comprises at least one of di(2ethylhexyl) phosphoric acid (DEHPA), 2-ethyl-hexyl-2-ethyl-hexyl-phosphoric acid, tri-butyl phosphate, versatic acid, and versavic 10.

Clause 7: The composite of any of clauses 1-6, wherein the polymer resin comprises a porous non-functional polymer resin.

Clause 8: The composite of any of clauses 1-7, wherein the polymer resin comprises at least one functional group selected from phosphoric acid groups, sulfonic acid groups, carboxylic acid groups, iminodiacetic acid, and amines.

Clause 9: A method for making a composite comprising: preparing an extractant solution in a container, soaking a polymer resin in the extractant solution to form a composite extractant-enhanced polymer resin; and separating the composite extractant-enhanced polymer resin from the extractant solution.

Clause 10: The method of clause 9, further comprising drying the composite extractant-enhanced polymer resin separated from the extractant solution.

Clause 11: The method of clause 9 or clause 10, wherein the separating step is performed by filtering, gravitational settling, or screening.

Clause 12: The method of any of clauses 9-11, wherein the extractant solution comprises at least one of an organic solvent and a modifier.

Clause 13: A method for extracting rare earth metals from an acid-leaching slurry or an acid-leaching solution comprising: providing an aqueous acid-leaching slurry or an acid-leaching solution containing rare earth metal ions; adding a cation-exchange resin that comprises phosphoric acid functional groups; mixing the cation-exchange resin with the aqueous acid-leaching slurry or acid-leaching solution to form a mixture slurry or solution; and separating the mixture slurry or solution into a rare-earth-metal-loaded cation-exchange resin and a raffinate slurry or solution.

Clause 14: The method of clause 13 further comprising stripping the rare earth metals from the rare-earth-metal-loaded cation-exchange resin.

Clause 15: The method of clause 14 further comprising regenerating the cation-exchange resin for reuse.

Clause 16: The method of any of clauses 13-15, wherein the method is carried out in one of a batch reactor or in a column process.

Clause 17: A method for extracting rare earth metals from an acid-leaching slurry or an acid-leaching solution comprising: providing an aqueous acid-leaching slurry or an acid-leaching solution; adding a composite comprising an extractant and a polymer resin; mixing the composite with the aqueous acid-leaching slurry or acid-leaching solution to form a mixture slurry or solution; and separating the mixture slurry or solution into a rare-earth-metal-loaded composite and a raffinate slurry or solution.

Clause 18: The method of clause 17 further comprising stripping the rare earth metals from the rare-earth-metal-loaded composite.

Clause 19: The method of clause 18 further comprising regenerating the composite resin for reuse.

Clause 20: The method of any of clauses 17-19, wherein the method is carried out in one of a batch reactor or in a column process.

Clause 21: The method of any of clauses 17-20, wherein, after mixing, the composite is loaded with at least 200 wt. ppm of rare earth metal.

Clause 21: The method of any of clauses 17-20, wherein, after mixing, the composite is loaded with at least 0.2 grams of rare earth metal per liter of composite.

Clause 23: A method for extracting rare earth metals from an acid-leaching slurry or an acid-leaching solution comprising mixing a composite comprising an extractant and a polymer resin with an aqueous acid-leaching slurry or acid-leaching solution to form a mixture slurry or solution, wherein, after mixing, the composite is loaded with at least 200 wt. ppm of rare earth metal.

Clause 24: A method for extracting rare earth metals from an acid-leaching slurry or an acid-leaching solution comprising mixing a composite comprising an extractant and a polymer resin with an aqueous acid-leaching slurry or acid-leaching solution to form a mixture slurry or solution, wherein, after mixing, the composite is loaded with at least 0.2 grams of rare earth metal per liter of composite.

The invention claimed is:

1. A method for extracting rare earth metals from an acid-leaching slurry or an acid-leaching solution comprising:
    providing an aqueous acid-leaching slurry or an acid-leaching solution;
    adding a composite comprising an extractant and a polymer resin, the polymer resin having at least one resin functional group, wherein the at least one resin functional group includes an anion functional group and/or a cation functional group;
    mixing the composite with the aqueous acid-leaching slurry or acid-leaching solution to form a mixture slurry or solution; and
    separating the mixture slurry or solution into a rare-earth-metal-loaded composite and a raffinate slurry or solution.

2. The method of claim 1 further comprising stripping the rare earth metals from the rare-earth-metal-loaded composite.

3. The method of claim 2 further comprising regenerating the composite resin for reuse.

4. The method of claim 1, wherein the method is carried out in one of a batch reactor or in a column process.

5. The method of claim 1, wherein, after mixing, the composite is loaded with at least 200 wt. ppm of rare earth metal.

6. The method of claim 1, wherein, after mixing, the composite is loaded with at least 0.2 grams of rare earth metal per liter of composite.

7. The method of claim 1, wherein the extractant is one of cationic, anionic, or a combination thereof.

8. The method of claim 1, wherein the extractant comprises a cation extractant having at least one functional group selected from organophosphorus acids, carboxylic acids, and sulfonic acids.

9. The method of claim 1, wherein the extractant comprises an anionic extractant having at least one amine functional group.

10. The method of claim 1, wherein the extractant comprises at least one of di(2ethylhexyl)phosphoric acid (DEHPA), 2-ethyl-hexyl-2-ethyl-hexyl-phosphoric acid, tri-butyl phosphate, versatic acid, and versavic 10.

11. The method of claim 1, wherein the polymer resin is porous.

12. The method of claim 1, wherein the at least one resin functional group includes at least one anion functional group and the at least one anion functional group is selected from the group consisting of sulfonic acid, carboxylic acid, iminodiacetic acid, and phosphoric acid.

13. The method of claim 12, wherein the at least one anion functional group is sulfonic acid.

14. The method of claim 12, wherein the at least one anion functional group is carboxylic acid.

15. The method of claim 12, wherein the at least one anion functional group is iminodiacetic acid.

16. The method of claim 12, wherein the at least one anion functional group is phosphoric acid.

17. The method of claim 1, wherein the at least one resin functional group includes at least one cation functional group.

18. The method of claim 17, wherein the at least one cation functional group is an amine.

* * * * *